(12) United States Patent
Izadi et al.

(10) Patent No.: US 8,368,663 B2
(45) Date of Patent: *Feb. 5, 2013

(54) TOUCH SENSING USING SHADOW AND REFLECTIVE MODES

(75) Inventors: Shahram Izadi, Cambridge (GB); Stephen Hodges, Cambridge (GB); David Alexander Butler, Cambridge (GB); Alban Rrustemi, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/313,700

(22) Filed: Dec. 7, 2011

(65) Prior Publication Data

US 2012/0075256 A1   Mar. 29, 2012

Related U.S. Application Data

(63) Continuation of application No. 11/693,683, filed on Mar. 29, 2007, now Pat. No. 8,094,129, which is a continuation-in-part of application No. 11/604,491, filed on Nov. 27, 2006, now Pat. No. 7,924,272.

(51) Int. Cl.
*G06F 3/041* (2006.01)
(52) U.S. Cl. ..... 345/173; 345/175; 345/211; 178/18.09; 713/340
(58) Field of Classification Search .......... 345/156–158, 345/173, 175, 176, 211; 715/702, 740; 178/18.01–19.04; 434/322–364; 315/149–150; 382/106, 107, 108, 154, 224; 713/300–320, 713/323–340
See application file for complete search history.

(56) References Cited

U.S. PATENT DOCUMENTS

| | | | |
|---|---|---|---|
| 4,710,760 A | 12/1987 | Kasday | |
| 4,782,328 A | 11/1988 | Denlinger | |
| 5,007,085 A | 4/1991 | Greanias et al. | |
| 5,442,376 A | 8/1995 | Tannenbaum et al. | |
| 5,543,591 A | 8/1996 | Gillespie et al. | |
| 5,584,552 A | 12/1996 | Nam-Su et al. | |
| 5,594,810 A | 1/1997 | Gourdol | |
| 5,615,003 A * | 3/1997 | Hermary et al. | 356/3.03 |

(Continued)

FOREIGN PATENT DOCUMENTS

| GB | 2315594 A | 2/1998 |
|---|---|---|
| KR | 20030028973 A | 4/2003 |

(Continued)

OTHER PUBLICATIONS

Abileah et al., "Integrated Optical Touch Panel in a 14.1 AMLCD," Date: May 2003, vol. 35, Issue: 1, p. 1544-1547, accessible at <<http://scitation.aip.org/getabs/servlet/GetabsServlet?>>.

(Continued)

*Primary Examiner* — Lun-Yi Lao
*Assistant Examiner* — Kelly B Hegarty
(74) *Attorney, Agent, or Firm* — Zete Law, P.L.L.C.; MacLane C. Key

(57) ABSTRACT

A touch panel is described which uses at least one infrared source and an array of infrared sensors to detect objects which are in contact with, or close to, the touchable surface of the panel. The panel may be operated in both reflective and shadow modes, in arbitrary per-pixel combinations which change over time. For example, if the level of ambient infrared is detected and if that level exceeds a threshold, shadow mode is used for detection of touch events over some or all of the display. If the threshold is not exceeded, reflective mode is used to detect touch events. The touch panel includes an infrared source and an array of infrared sensors.

20 Claims, 17 Drawing Sheets

U.S. PATENT DOCUMENTS

| | | | |
|---|---|---|---|
| 5,729,251 | A | 3/1998 | Nakashima |
| 5,764,223 | A | 6/1998 | Chang et al. |
| 5,784,060 | A | 7/1998 | Bertram et al. |
| 5,825,352 | A | 10/1998 | Bisset et al. |
| 5,835,078 | A | 11/1998 | Arita et al. |
| 5,929,432 | A | 7/1999 | Yamakawa |
| 5,986,745 | A * | 11/1999 | Hermary et al. ............. 356/3.03 |
| 6,002,387 | A | 12/1999 | Ronkka et al. |
| 6,023,265 | A | 2/2000 | Lee |
| 6,229,529 | B1 | 5/2001 | Yano et al. |
| 6,324,310 | B1 | 11/2001 | Brownlee |
| 6,538,644 | B1 | 3/2003 | Muraoka |
| 6,747,290 | B2 | 6/2004 | Yamazaki et al. |
| 6,856,259 | B1 | 2/2005 | Sharp |
| 6,879,319 | B2 | 4/2005 | Cok |
| 6,888,536 | B2 | 5/2005 | Westerman et al. |
| 6,995,743 | B2 | 2/2006 | Boer et al. |
| 6,995,752 | B2 | 2/2006 | Lu |
| 7,009,663 | B2 | 3/2006 | Abileah et al. |
| 7,050,048 | B2 | 5/2006 | Ito |
| 7,053,967 | B2 | 5/2006 | Abileah et al. |
| 7,158,118 | B2 | 1/2007 | Liberty |
| 7,173,604 | B2 | 2/2007 | Marvit et al. |
| 7,272,255 | B2 * | 9/2007 | Ishiyama ...................... 382/154 |
| 7,360,708 | B2 | 4/2008 | Miyake et al. |
| 7,365,736 | B2 | 4/2008 | Marvit et al. |
| 7,548,230 | B2 | 6/2009 | Corson |
| 7,584,432 | B1 | 9/2009 | Oakley et al. |
| 7,646,379 | B1 | 1/2010 | Drennan et al. |
| 7,764,274 | B2 | 7/2010 | Westerman et al. |
| 7,924,272 | B2 | 4/2011 | Boer et al. |
| 7,932,913 | B2 * | 4/2011 | Ishiyama ...................... 345/582 |
| 8,094,129 | B2 | 1/2012 | Izadi et al. |
| 2002/0050983 | A1 | 5/2002 | Liu et al. |
| 2003/0103030 | A1 | 6/2003 | Wu |
| 2003/0107748 | A1 | 6/2003 | Lee |
| 2003/0137494 | A1 | 7/2003 | Tulbert |
| 2004/0263482 | A1 | 12/2004 | Goertz |
| 2005/0110964 | A1 * | 5/2005 | Bell et al. ...................... 353/122 |
| 2005/0122308 | A1 * | 6/2005 | Bell et al. ...................... 345/156 |
| 2005/0134751 | A1 | 6/2005 | Abileah et al. |
| 2005/0162381 | A1 * | 7/2005 | Bell et al. ...................... 345/156 |
| 2005/0200293 | A1 * | 9/2005 | Naugler et al. ............... 315/149 |
| 2005/0219204 | A1 | 10/2005 | Huddleston et al. |
| 2005/0225546 | A1 | 10/2005 | Akimoto |
| 2005/0226505 | A1 | 10/2005 | Wilson |
| 2005/0230609 | A1 | 10/2005 | Randall |
| 2005/0236481 | A1 | 10/2005 | Gascoyne et al. |
| 2005/0259266 | A1 | 11/2005 | Seko |
| 2006/0007248 | A1 * | 1/2006 | Reddy et al. ................... 345/690 |
| 2006/0145365 | A1 | 7/2006 | Halls et al. |
| 2006/0146038 | A1 * | 7/2006 | Park et al. ...................... 345/173 |
| 2006/0227120 | A1 | 10/2006 | Eikman |
| 2006/0244693 | A1 * | 11/2006 | Yamaguchi et al. ............ 345/76 |
| 2006/0279690 | A1 | 12/2006 | Yu et al. |
| 2006/0284857 | A1 * | 12/2006 | Oh ................................ 345/173 |
| 2007/0113207 | A1 | 5/2007 | Gritton |
| 2007/0273670 | A1 | 11/2007 | Nordahl |
| 2008/0121442 | A1 | 5/2008 | Boer et al. |
| 2008/0122792 | A1 | 5/2008 | Izadi et al. |
| 2008/0122803 | A1 | 5/2008 | Izadi et al. |
| 2008/0150890 | A1 * | 6/2008 | Bell et al. ...................... 345/156 |
| 2008/0150913 | A1 * | 6/2008 | Bell et al. ...................... 345/175 |
| 2008/0198138 | A1 | 8/2008 | McFarlane et al. |
| 2009/0021488 | A1 | 1/2009 | Kali et al. |
| 2010/0177060 | A1 * | 7/2010 | Han .............................. 345/174 |
| 2011/0157094 | A1 | 6/2011 | Boer et al. |
| 2011/0169779 | A1 | 7/2011 | Boer et al. |
| 2012/0075256 | A1 | 3/2012 | Izadi et al. |

FOREIGN PATENT DOCUMENTS

| | | | |
|---|---|---|---|
| KR | 20050073631 A | 7/2005 | |

OTHER PUBLICATIONS

Albinsson et al., "High Precision Touch Screen Interaction," Date: Apr. 5-10, 2003, p. 105-112, vol. No. 5, Issue No. 1, Ft. Lauderdale, FR, accessible at <<http://delivery.acm.org/1 0.1145/650000/642631/p105-albinsson.pdf?key1 =642631&key2=2760516511 & coli=portal&di=GUIDE&CFID=547568&CFTOKEN=88>>.

Boer et al., "Active Matrix LCD with Integrated Optical Touch Screen," Date: 2003, SID 03 Digest, 4 pages, accessible at <<http://wwvv.pianar.com/advantages/WhitePapers/docs/Pianar-AMLCD-Optical-Touch screen. pdf#search=%22%22Active%20Matrix%20LCD%20withf%20 INteg rated%>>.

"Fastcompany.com," retrieved on Mar. 23, 2007, at <<http://fastcompany.com/video/general/perceptivepixel.html >>, Mansueto Ventures LLC., 2007, 1 page.

Han, "Multi-Touch Interaction Research," retrieved on Mar. 3, 2007, at <<http://cs.nyu.edu/~jhan/ftirtouch/index.html>>, Jeff Han, 2006, 4 pages.

Hinckley et al., "Touch-Sensing Input Devices," available at least as early as Mar. 12, 2007, at <<http://www.cs.ubc.ca/labs/spin/publications/related/hinckley99.pdf>>, ACM, 1999, pp. 223-230.

Han, "Low-Cost Multi-Touch Sensing through Frustrated Total Internal Reflection," UISET'05, Date: Oct. 23-27, 2005, p. 115-118, Seattle, WA, accessible at <<http://deiivery.acm.org/10.1145/1100000/1095054/p115-han.pdf?>>.

Marino et al., "Programming for Multiple Touches and Multiple Users: A Toolkit for the DiamondTouch Hardware," available at least as early as Mar. 12, 2007, at <<http://grouplab.cpsc.ucalgary.ca/papers/2003/03-DiamondTouch.UISTDemo/03-DiamondTouch-UISTDemo.pdf>>, ACM, 2003, 2 pages.

Matsushita et al., "HoloWall: Designing a Finger, Hand, Body, and Object Sensitive Wall," UIST'97, 1997, Banff, Alberta, Canada, pp. 209-210.

"Multi-Touch Sensing through Frustrated Total Internal Reflection," retrieved on Mar. 3, 2007, at <<http://cs.nyu.edu/~jhan/ftirsense/index.html>>, ACM, 2005, 2 pages.

"Mutli-Touch Sensing through LED Matrix Displays," retrieved on Mar. 3, 2007, at <<http://cs.nyu.edu/~jhan/ledtouch/index.html >>, 1 page.

Office Action for U.S. Appl. No. 11/604,491, mailed Feb. 17, 2010, related to U.S. Appl. No. 11/693,670, "Communication with a Touch Screen," 18 pages.

Office Action for U.S. Appl. No. 11/693,683, mailed Feb. 23, 2010, related to U.S. Appl. No. 11/693,670, "Communication with a Touch Screen," 20 pages.

Office Action for U.S. Appl. No. 11/693,683, mailed Jun. 23, 2011, related to U.S. Appl. No. 11/693,670, "Communication with a Touch Screen," 25 pages.

Office Action for U.S. Appl. No. 11/693,683, mailed Aug. 3, 2010, related to U.S. Appl. No. 11/693,670, "Communication with a Touch Screen," 18 pages.

Office Action for U.S. Appl. No. 11/604,491, mailed Sep. 3, 2010, related to U.S. Appl. No. 11/693,670, "Communication with a Touch Screen," 18 pages.

Office Action for U.S. Appl. No. 11/693,670, mailed on Nov. 10, 2011, Shahram Izadi, "Communication with a Touch Screen." 17 pages.

Office Action for U.S. Appl. No. 11/693,683, mailed Dec. 28, 2010, related to U.S. Appl. No. 11/693,670, "Communication with a Touch Screen," 22 pages.

Final Office Action for U.S. Appl. No. 11/693,683, mailed on Jun. 23, 2011, Shahram Izadi, "Touch Sensing Using Shadow and Reflective Modes," 25 pages.

Final Office Action for U.S. Appl. No. 11/693,670, mailed on Jun. 23, 2011, Shahram Izadi, "Communication with a Touch Screen," 17 pages.

Paradiso, "Several Sensor Approaches that Retrofit Large Surfaces for Interactivity," ACM, 2002, 8 pages.

International Search Report and Written Opinion for PCT/US2008/058805, mailed Aug. 11, 2008, counterpart of U.S. Appl. No. 11/693,670, title "Communication with a Touch Screen," 12 pages.

International Search Report and Written Opinion, for PCT/US2008/058803, mailed Aug. 8, 2008, counterpart of U.S. Appl. No. 11/693,683, title "Communication with a Touch Screen," 11 pages.

Klink, "Philips Research Press Release," Jan. 4, 2006, obtained from <<http://www.research.ph ilips.com/newscenter/archive/2006/060104-entert>>, 3 pages.

Rekimoto, "SmartSkin: An Infrastructure for Freehand Manipulation on Interactive Surfaces," available at least as early Mar. 12, 2007, at <<http://delivery.acm.org/10.1145/510000/503397/p113-rekimoto.pdf?key1=503397&key2=5112863711&coll=GUIDE& dl=GUIDE& CFID=13417221&CFTOKEN=15136912>>, ACM, vol. 4, No. 1, 2002, pp. 113-120.

"Touch Panel," retrieved on Mar. 3, 2007, at <<http://en.wikipedia.org/wiki/Touch_panel >>, Wikimedia Foundation, Inc., 2007, 2 pages.

Office Action for U.S. Appl. No. 13/046,618, mailed Feb. 6, 2012, Willem den Boer et al, "Infrared Sensor Integrated in a Touch Panel," 19 pages.

Office Action for U.S. Appl. No. 13/046,481, mailed Feb. 7, 2012, Willem den Boer et al, "Infrared Sensor Integrated in a Touch Panel," 18 pages.

* cited by examiner

TOUCH SENSING USING SHADOW AND REFLECTIVE MODES

CROSS-REFERENCE TO RELATED APPLICATION(S)

This application is a continuation of and claims priority to U.S. patent application Ser. No. 11/693,683, filed on Mar. 29, 2007, which is a continuation in part of U.S. utility application Ser. No. 11/604,491, filed on Nov. 27, 2006, both of which are incorporated herein by reference.

BACKGROUND

Touch screens (or touch panels) are increasingly being used to provide user interfaces for devices such as tablet PCs, self-service terminals and mobile devices such as PDAs and mobile telephones. There are a number of different technologies which may be used, for example a resistive touch panel in which touching the screen causes layers, which are normally separated by a small gap, to come into contact or a capacitive touch panel in which contact with a conductive object changes the capacitance.

In another example, a touch screen may use optical sensors (e.g. an optical sensor array) to detect when a screen is touched. Use of optical sensors enables multi-touch sensing, i.e. detection of multiple simultaneous touches on the same screen. Such optical touch screens use one of two modes of operation: shadow mode or reflective mode. In shadow mode, the sensor detects the shadow which is cast by the object coming into contact with the screen. This mode of operation is affected by the level of ambient visible lighting and if it is too dark there may be no shadow and so the touch screen will fail to detect touch events. In reflective mode, the touch screen includes a light source (or illuminant) which illuminates objects which are brought into contact with the screen. The sensor detects the light reflected back by the objects. Where the touch screen includes an LCD screen, such that images can also be displayed on the screen, the image may affect the detection of objects because different color regions will allow different amounts of light to be transmitted through. This therefore affects how much of the illuminant reaches the object and also how much of the reflected light reaches the sensor.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

A touch panel is described which uses at least one infrared source and an array of infrared sensors to detect objects which are in contact with, or close to, the touchable surface of the panel. The panel may be operated in both reflective and shadow modes, in arbitrary per-pixel combinations which change over time. For example, if the level of ambient infrared is detected and if that level exceeds a threshold, shadow mode is used for detection of touch events over some or all of the display. If the threshold is not exceeded, reflective mode is used to detect touch events. The touch panel includes an infrared source and an array of infrared sensors.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Use of infra-red sources as opposed to visible light, as described in U.S. utility application Ser. No. 11/604,491 entitled "Infrared sensor integrated in a touch panel" filed on Nov. 27, 2006, which is incorporated herein by reference, has the benefit that the graphic image displayed on the touch screen is not affected by the detection of touch events. Additionally, the amount of ambient visible light does not affect the detection.

Figure 1:
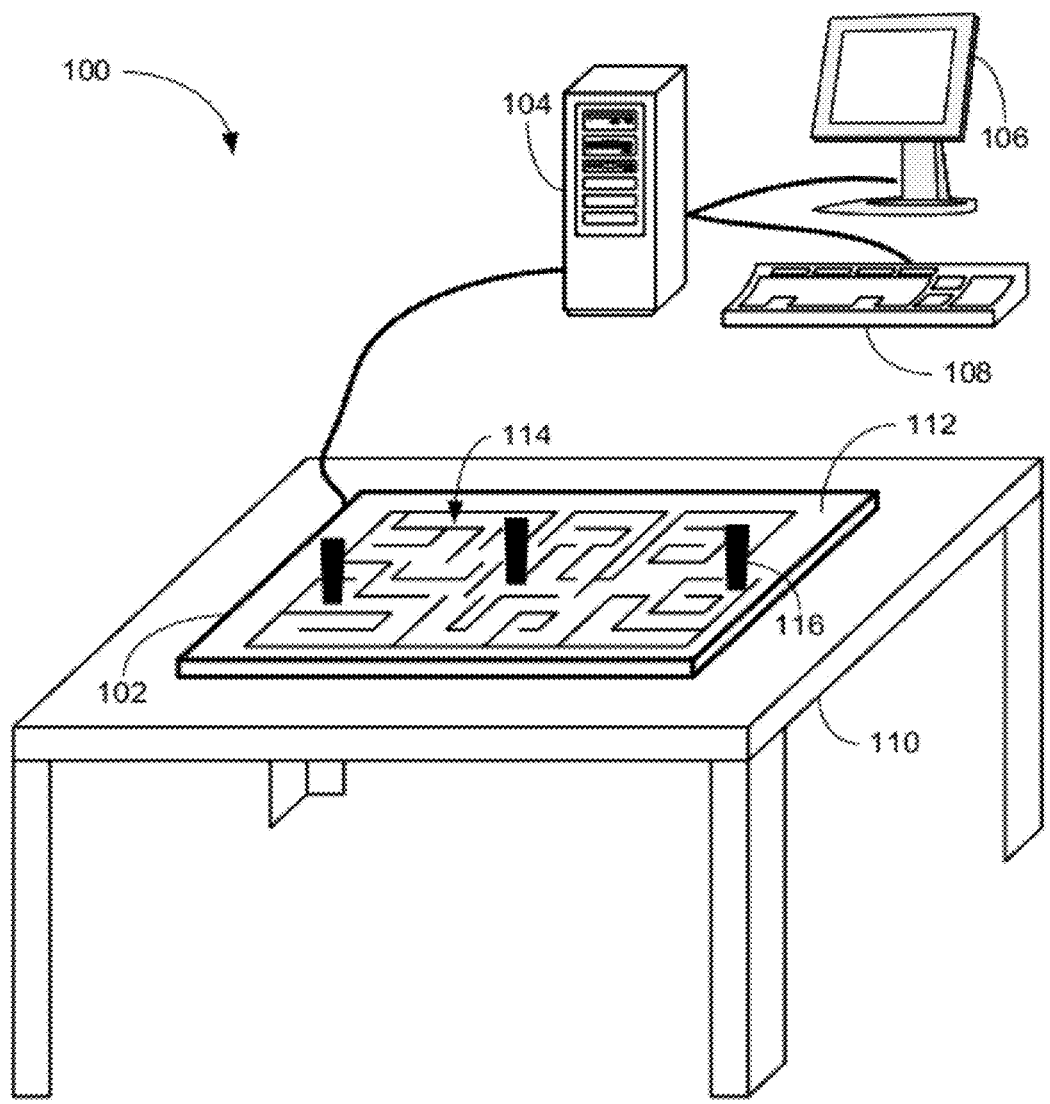
FIG. 1 illustrates an exemplary interactive display system incorporating a touch panel system.

FIG. 1 illustrates an exemplary interactive display system incorporating a touch panel system. An interactive display system 100 comprises a touch panel system 102 coupled to a computer 104. Computer 104 may be controlled via a monitor 106 and a keyboard 108 or any other suitable user interface. Touch panel system 102 is thin and is generally placed on a flat surface, such as the top of a table 110 or hanging from a wall. Touch panel system 102 comprises a touch panel and has a touchable surface 112. The touch panel is, in this example, also a display, and a graphic image 114 displayed by the display is viewable via touchable surface 112. In the example shown in FIG. 1, the graphic image 114 is that of a maze. Computer 104 provides processing power that yields a rich user interactive experience. As players move physical game pieces 116 around the maze, touch panel system 102 is able to detect the location of the game pieces, and to alter the displayed graphic image accordingly. For example, the walls of the maze may be moved to increase the complexity of the game, or a video clip may be shown if a game piece is placed on a certain location in the maze.

Infrared (IR) sources in system 102 illuminate the physical game pieces 116. IR radiation reflected from game pieces 116 is detected by IR sensors that are integrated into the touch panel. Signals from the IR sensors are processed by computer 104 to identify the locations of physical game pieces 116 on touchable surface 112. Any suitable method for distinguishing between different game pieces 116 on touchable surface 112 may be used. For example, physical game pieces 116 may have distinct shapes or may have symbols such as bar codes imprinted on their undersides.

For example the touch panel comprises a plurality of retro-reflective opto sensors which operate in the infrared part of the spectrum. Each such opto sensor comprises two components: an IR emitter and an optically isolated IR light sensor. It is therefore capable of both emitting light, and, at the same time, detecting the intensity of incident light. If a reflective object is placed in front of the sensing element, some of the emitted light will be reflected back and will therefore be detected.

Figure 2:
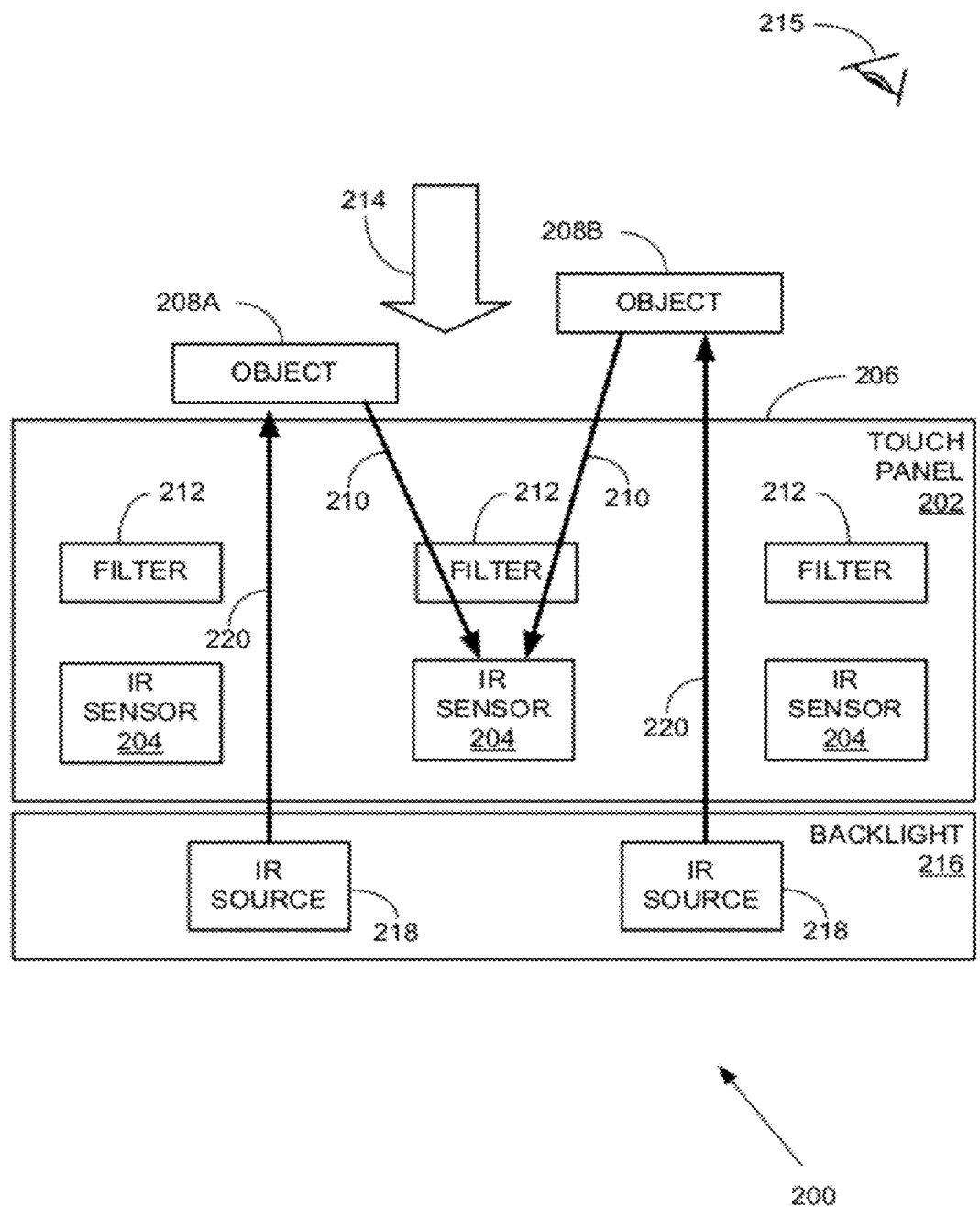
FIG. 2 illustrates a cross-section through an exemplary touch panel system.

FIG. 2 illustrates a cross-section of an exemplary touch panel system. A touch panel system 200 comprises a touch panel 202 that has several infrared (IR) sensors 204 integrated therein. Objects above a touchable surface 206 include an object 208A that is in contact with touchable surface 206 and an object 208B that is close to but not in actual contact with ("adjacent") touchable surface 206. Infrared sensors 204 are distributed throughout touch panel 202 parallel to touchable surface 206. One of infrared sensors 204 may detect infrared radiation reflected from objects 208A and 208B, as indicated by arrows 210. Although the term "above" is used in this description, it should be understood that the orientation of the touch panel system is irrelevant. As shown in FIG. 2, touchable surface 206 is horizontal, but in a different embodiment generated by rotating system 200 clockwise by 90 degrees, touchable surface 206 could be vertical. In that embodiment, the objects from which reflected IR radiation is detected are to the side of touchable surface 206. The term "above" is intended to be applicable to all such orientations.

Touch panel 202 may comprise filters 212 that absorbs visible light and transmits infrared radiation and are located between touchable surface 206 and IR sensors 204 in order to shield IR sensors 204 from visible light 214 incident on touchable surface 206 in the case where IR sensors 204 are sensitive to a broader range of wavelengths of light other than purely infrared wavelengths.

Touch panel 202 may comprise a display that is configured to display images that are viewable via touchable surface 206. An eye 215 indicates a possible direction from which the images are viewed. The display may be, for example, an LCD, an organic light emitting diode (OLED) display, a flexible display such as electronic paper, or any other suitable display in which an IR sensor can be integrated.

System 200 may comprise a backlight 216 for the display. Backlight 216 may comprise at least one IR source 218 that is configured to illuminate objects in contact with or adjacent touchable surface 206 with infrared radiation through touchable surface 206, as indicated by arrows 220. IR sensor 204s are only sensitive to radiation incident from above, so IR radiation traveling directly from backlight 216 to IR sensor 204s is not detected.

The output of IR sensors 204 may be processed to identify a detected infrared image. The IR radiation reflected from the objects may be reflected from reflective ink patterns on the objects, metal designs on the objects or any other suitable reflector. For example, white paper reflects IR radiation and black ink absorbs IR radiation, so a conventional bar code on a surface of an object may be detected by an infrared-sensing device according to the described technology. Fingers are estimated to reflect about 10% of the near IR, which is sufficient to detect that a finger or hand is located at a particular location on or adjacent the touchable surface. A higher resolution of IR sensors may be used to scan objects to do applications such as document scanning and fingerprint recognition. For example, fingerprint recognition generally requires a resolution of more than 200 dots per inch (dpi).

FIG. 2 provides just one example of an exemplary touch panel system. In other examples, the backlight may not comprise any IR sources and the touch panel may include a frontlight which comprises at least one IR source. In such an example, the touchable surface of the system is a surface of the frontlight and not of the touch panel. The frontlight may comprise a light guide, so that IR radiation emitted from IR source travels through the light guide and is directed towards touchable surface and any objects in contact with or adjacent to it. In other touch panel systems, both the backlight and frontlight may comprise IR sources. In yet other touch panel systems, there is no backlight and the frontlight comprises both IR sources and visible light sources. In further examples, the system may not comprise a frontlight or a backlight, but instead the IR sources may be integrated within the touch panel. In an implementation, the touch panel may comprise an OLED display which comprises IR OLED emitters and IR-sensitive organic photosensors (which may comprise reverse-biased OLEDs).

In some touch panel systems, the touch panel may not comprise a display. Even if the touch panel comprises one or more components or elements of a display, the touch panel may be configured as to not display any images. For example, this may be the case when the input tablet is separate from the display. Other examples include a touchpad, a gesture pad, and similar non-display devices and components.

For some applications, it may be desirable to detect an object only if it is in actual contact with the touchable surface of the touch panel system. The IR source of the touch panel system may be turned on only if the touchable surface is touched. Alternatively, the IR source may be turned on regardless of whether the touchable surface is touched, and detection of whether actual contact between the touchable surface and the object occurred is processed along with the output of the IR sensor. Actual contact between the touchable surface and the object may be detected by any suitable means, including, for example, by a vibration sensor or microphone coupled to the touch panel. A non-exhaustive list of examples for sensors to detect contact includes pressure-based mechanisms, micro-machined accelerometers, piezoelectric devices, capacitive sensors, resistive sensors, inductive sensors, laser vibrometers, and LED vibrometers.

IR sensors 204 may comprise suitable infrared-sensitive semiconductor elements. A non-exhaustive list of examples of semiconductor material that is infrared-sensitive includes polycrystalline silicon, monocrystalline silicon, microcrystalline silicon, nanocrystalline silicon, plastic semiconductors and other non-silicon based semiconductors. Devices based on polycrystalline, microcrystalline, monocrystalline or nanocrystalline silicon may have better stability than amorphous silicon devices. TFTs based on polycrystalline, microcrystalline, monocrystalline or nanocrystalline silicon may have higher field mobility than amorphous silicon TFTs.

Figure 3:
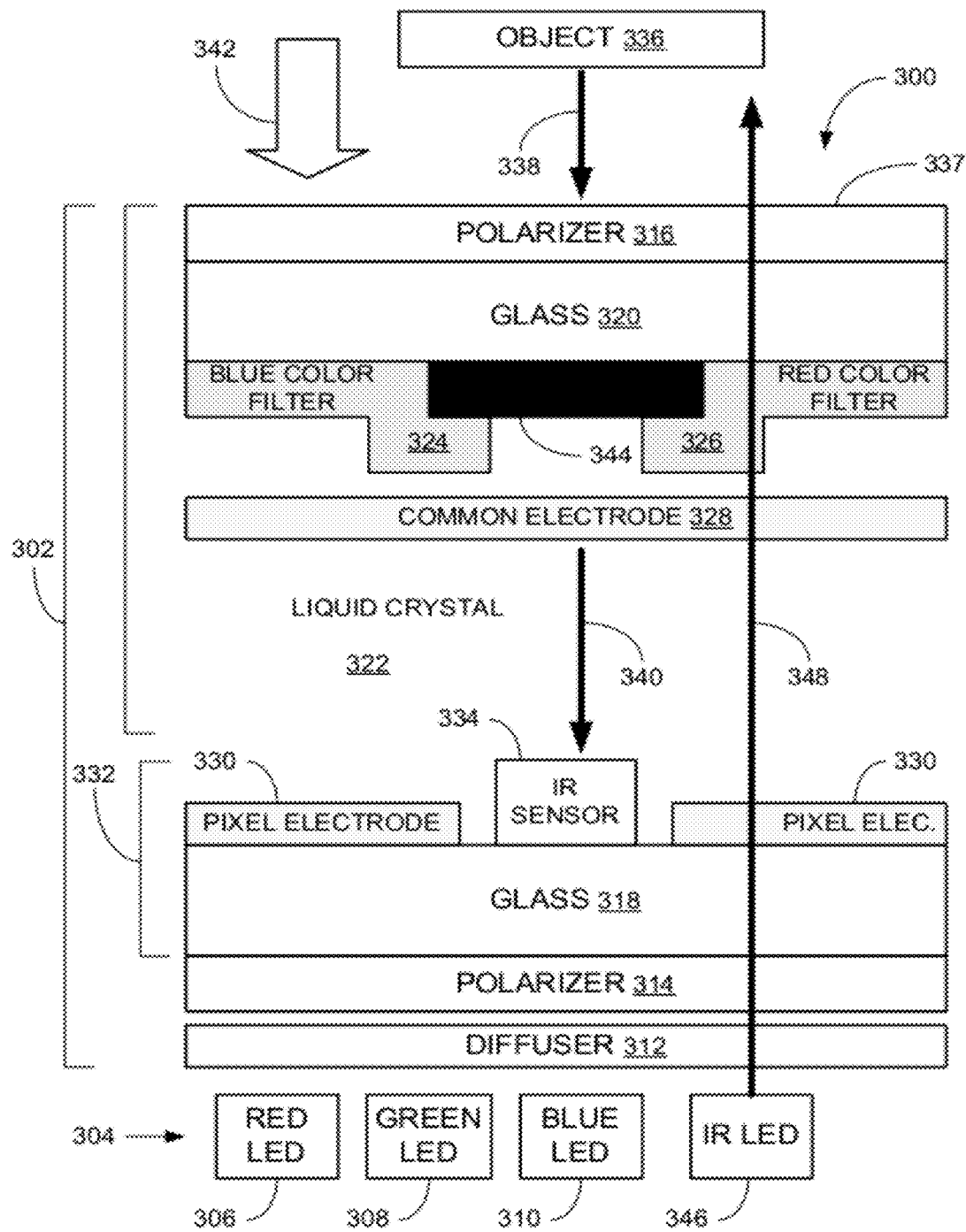
FIG. 3 illustrates a cross-section of an exemplary touch panel system having an exemplary liquid crystal display incorporated therein.

FIG. 3 illustrates a cross-section of an exemplary touch panel system having an exemplary LCD incorporated therein. A touch panel system 300 comprises a liquid crystal display 302 and a backlight 304. Backlight 304 comprises arrays of light-emitting diodes (LEDs). In a color backlight, red LEDs 306, green LEDs 308 and blue LEDs 310 may be used. Liquid crystal display 302 typically comprises a diffuser 312 to disperse the light from backlight 304 and obtain a more uniform intensity over the surface of the display.

LCD 302 comprises a pair of polarizers 314 and 316 separated by a pair of glass substrates 318 and 320, which in turn are separated by a layer of liquid crystal material 322 contained in a cell gap between substrates 318 and 320. In other implementations, substrates 318 and 320 may be constructed from another transparent material, for example, plastic. Color filters, for example, a blue color filter (CF) 324 and a red color filter 326, are adjacent the inner surface of substrate 320. Each color filter transmits only part of the visible spectrum.

In the example shown in FIG. 3, LCD 102 is an active matrix LCD. A continuous electrode 328, termed "common electrode", is located between the color filters and liquid crystal material 322. Electrode 328 is constructed using any suitable transparent electrode material, for example, indium tin oxide (ITO). Individual pixel electrodes 330 may be patterned from any suitable transparent electrode material, for example, ITO, and located on the inner surface of substrate 318. In a TFT active matrix LCD, substrate 318 includes TFTs which act as individual switches for each pixel electrode 330 (or group of pixel electrodes) corresponding to a pixel (or a group of pixels). The TFTs are described in further detail below with respect to FIG. 6. Pixel electrodes 330, the TFTs, and substrate 318 form a backplane 332 of LCD 302.

It is known, although not widely, that polarizers and color filters lose their function in the near infrared (IR) region of the spectrum. A sheet polarizer no longer polarizes electromagnetic waves at wavelengths larger than about 800 to 850 nm. Red, green and blue pigment color filters, typically used in LCDs, also transmit most of the wavelengths in the near infrared region of the spectrum. Hence, some near infrared light is transmitted through a conventional LCD, independent of the image displayed on the LCD display screen. For example, 40% of the near infrared light incident on one surface (front or back) of a conventional LCD may be transmitted through the LCD. The precise percentage of near infrared light transmitted through a particular LCD may depend on several factors, including, for example, the pixel aperture ratio and internal reflections in the cell.

LCD 302 comprises an IR sensor 334 integrated therein. As shown in FIG. 3, IR sensor 334 is integrated into backplane 332. Any IR light reflected from an object 336 in contact with or adjacent a touchable surface 337 of LCD 302 will be transmitted through polarizer 316, substrate 320, common electrode 328, liquid crystal material 322 and detected by IR sensor 334. An arrow 338 indicates the IR light reflected from object 336 and an arrow 340 indicates the IR light in liquid crystal material 322, the IR light possibly attenuated by polarizer 316, substrate 320, and common electrode 328.

IR sensor 334 may include, for example, a polycrystalline silicon TFT or photodiodes, a monocrystalline silicon TFT or photodiode, a microcrystalline silicon TFT or photodiode, or a nanocrystalline silicon TFT or photodiode. Infrared-sensitive semiconductor materials that are not based in silicon are also contemplated for elements of IR sensor 334.

In order to block visible light from reaching IR sensor 334, an IR-transmitting and visible-light absorbing filter may be integrated in LCD 302 opposite IR sensor 334. If such a filter is integrated in LCD 302, the susceptibility of the IR sensor to noise from ambient lighting 342, may be reduced. In the example shown in FIG. 3, the filter is an IR-transmitting polymer black matrix 344. In other examples, the filter may be comprised of two complementary color filters that are overlapping, for example, blue color filter 324 and red color filter 326. This implementation relies on the typical characteristics of visible light filters used in LCDs.

Backlight 304 comprises an IR source, which in this example is an IR LED 346. IR LEDs are commercially available at a low cost at a range of wavelengths, including, for example, peak emission wavelengths around 900 nm: 850 nm, 860 nm, 870 nm, 880 nm, 890 nm, 935 nm, 940 nm and 950 nm. At some of these wavelengths, high power versions of the IR LEDs are available. Infrared radiation from the IR source, indicated by an arrow 348, is transmitted through LCD 302 after being diffused by diffuser 312, if present. Some of the infrared radiation transmitted through LCD 304 is reflected off object 336 and detected by IR sensor 334 as described above.

As with FIG. 2, FIG. 3 provides just one example of an exemplary touch panel system having an exemplary liquid crystal display incorporated therein. In other examples, the backlight may not comprise an IR source and instead a frontlight external to an outer surface of polarizer 316 may be used. The frontlight may comprises an infrared light guide and an IR source coupled to light guide to direct the light away from the LCD towards the objects which are in proximity or contact with the touch surface. In another example, an IR source which emits polarized IR radiation may be used without a light guide and polarization filters and/or reflectors blocking that polarization may be provided between the frontlight and the LCD. IR light reflected off an object is not polarized, will pass through the polarization filters and/or reflectors, and be detected by an IR sensor. In other embodiments, the touch panel system could comprise an LCD with an active matrix frontplane, a passive matrix backplane or a passive matrix frontplane. Whilst the example of FIG. 3 shows an LCD with an IR-transmitting and visible-light absorbing filter between the touchable surface of the system and the IR sensor, in other embodiments, the LCD may lack such a filter.

Figure 4:
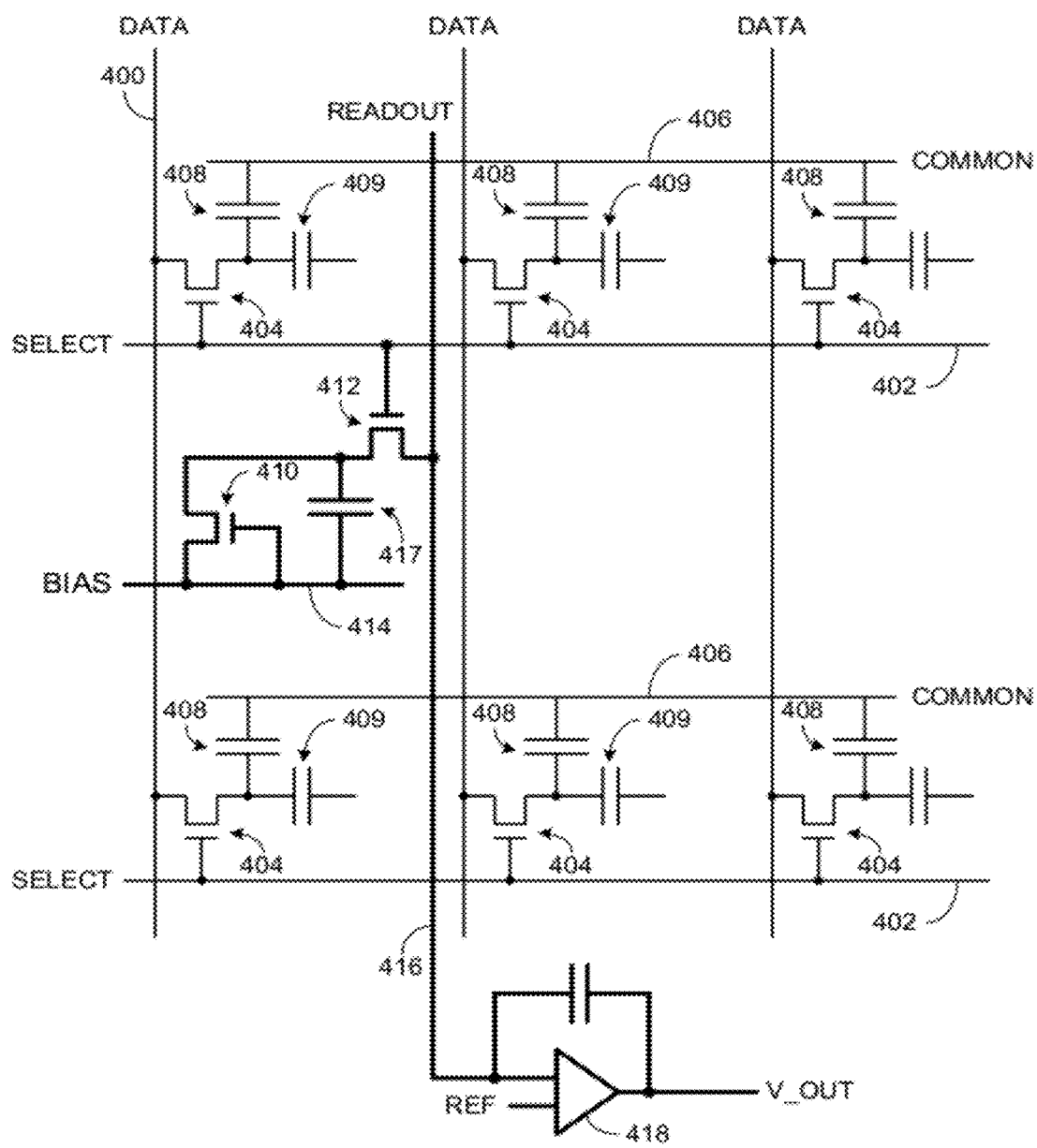
FIG. 4 illustrates an exemplary active matrix circuit having a TFT-based infrared sensor integrated therein.

FIG. 4 illustrates an active matrix circuit having a TFT-based infrared sensor integrated therein. As is known in the art, an active matrix layer comprises a set of data lines 400 and a set of select lines 402. An array of conductive lines may be created by including one data line for each column of pixels across the display and one select line for each row of pixels down the display. For each pixel, the active matrix layer also comprises a pixel TFT 404 capacitively coupled to a common line 406 through a capacitor 408. The source of pixel TFT 404 is coupled to its respective data line 400 and the drain of pixel TFT 404 is coupled to its respective select line 402. To load the data to the respective pixels indicating which pixels should be illuminated, normally in a row-by-row manner, a set of voltages are imposed on the respective data lines 400 which imposes a voltage on the sources of pixel TFTs 404. The selection of a respective select line 402, interconnected to the gates of pixels TFTs 404, permits the voltage imposed on the sources to be passed to drains of the pixel TFTs 404. The drains of the pixel TFTs are electrically connected to respective pixel electrodes. In addition, a respective capacitance exists between the pixel electrodes enclosing the liquid crystal material, noted as capacitances 409. Common line 406 provides a voltage reference. In other words, the voltage data (representative of the image to be displayed) is loaded into the data lines for a row of pixel TFTs 404 and imposing a voltage on select line 402 latches that data into the holding capacitors and hence the pixel electrodes.

To integrate an IR sensor into the liquid crystal circuit, the active matrix layer also comprises an infrared-sensitive TFT 410 interconnected to a readout TFT 412. The gate of readout TFT 412 may be interconnected to select line 402, and the drain and the gate of infrared-sensitive TFT 410 may be interconnected to a photobias line 414. (In other implementations, photobias line 414 and common line 606 may be one and the same.) The source of readout TFT 412 may be interconnected to a readout line 416. A capacitor 417 may interconnect photobias line 414 to the transistors. Readout line 416 is coupled to an operational amplifier 418 connected to a reference voltage. The TFTs may be addressed by a set of multiplexed electrodes running along the gaps between the pixel electrodes. Alternatively, the pixel electrodes may be on a different layer from the TFTs.

When a voltage is imposed on select line 402, this causes the voltage on readout line 416 to be coupled to the drain of infrared-sensitive TFT 410 and the drain of readout TFT 412, which results in a voltage potential across capacitor 417. The state of infrared-sensitive TFT 410 ("on" or "off") will depend on whether IR radiation is incident on infrared-sensitive TFT 410. For example, when a person touches the panel, the IR reflection off the finger (about 10%) will turn the infrared-sensitive TFT 410 partially "on". If infrared-sensitive TFT 410 is "off", the voltage imposed across capacitor 417 will not significantly discharge through infrared-sensitive TFT 410, and accordingly, the charge stored in capacitor 417 will be substantially unchanged. If infrared-sensitive TFT 410 is "on", the voltage imposed across capacitor 417 will significantly discharge through infrared-sensitive TFT 410, and accordingly, the charge stored in capacitor 417 will be substantially changed. To determine how much charge has leaked from capacitor 417, a voltage is imposed on select line 402. This turns on readout TFT 412 and a charge flows through readout line 416 to reset the charge on capacitor 417. The output voltage of operational amplifier 418 is proportional or otherwise associated with the charge needed to reset the voltage on capacitor 417 and is therefore a measure of the amount of IR radiation incident on infrared-sensitive TFT 410 during the preceding frame time. This output may be processed along with the output from other IR sensors in the circuit to identify a detected infrared image.

Infrared-sensitive TFT 410 and readout TFT 412, and the rest of the transistors in the active matrix layer, may comprise any suitable semiconductor material that is sensitive to infrared radiation, including polycrystalline silicon, monocrystalline silicon, microcrystalline silicon, nanocrystalline silicon, a plastic semiconductor material, and semiconductor materials that are not silicon-based.

For example, a microcrystalline silicon phototransistor can be manufactured with Plasma chemical vapor deposition (CVD) equipment on the same line as amorphous silicon TFTs. A large installed capacity is available for manufacturing a-Si TFT LCDs.

In another example the active matrix circuit may have a photodiode-based infrared sensor integrated therein. Such a circuit would differ from that of FIG. 4 in that an infrared-sensitive photodiode replaces the infrared-sensitive TFT 410. The photodiode would be interconnected to readout TFT 412, with the anode of photodiode interconnected to photobias line 414, and the cathode of photodiode interconnected to the drain of readout TFT 412. For example, the IR-sensitive photodiode may be a lateral PIN diode of polycrystalline silicon, and can be manufactured with a standard Low Temperature Poly Silicon Complementary Metal-Oxide Semiconductor (CMOS) process, which is common in the active matrix LCD industry.

A further exemplary active matrix circuit may have a TFT-based infrared sensor integrated therein. Such a circuit may comprise pixel circuits having two TFTs per pixel: a drive TFT and an access TFT. Each pixel circuit also comprises a storage capacitor and an OLED coupled to a common OLED electrode. The source of each access TFT is coupled to its respective data line and the drain of each access TFT is coupled to its respective select line. The access TFT is capacitively coupled to a common bias line through storage capacitor. There are many other variations of pixel circuits having two or more TFTs per pixel.

To integrate an IR sensor into the active matrix OLED circuit, the active matrix layer also comprises an infrared-sensitive TFT interconnected to a readout TFT in a similar manner to that shown in FIG. 4 and described above.

In another exemplary active matrix OLED circuit, an infrared-sensitive photodiode may replace the infrared-sensitive TFT.

The IR sensors in a touch panel system according to the described technology will also be sensitive to IR in the ambient radiation. Room light from incandescent lamps has a significant IR component. Likewise, in outdoor conditions, the solar spectrum at different times of the day includes IR radiation. It is known that the solar spectrum has a dip at about 920 nm. Therefore, IR sources emitting a peak wavelength at or near 920 nm may be used.

To improve signal-to-noise ratio in a touch panel system according to the described technology, the IR source may be pulsed in synchronization with the detection by the IR sensor. For example, for a sensor that integrates the signal during the frame time, the IR source(s) may be "on" during the odd frames and "off" during the even frames. This requires vertical scanning of the array of IR LEDs in the addressing direction of the rows. The differential signal between odd frames and even frames may cancel out the direct current (DC) noise from an IR background. The signal-to-noise ratio may also be improved by increasing the intensity of the IR source.

In a further example, the illuminant (i.e. the IR sources) may be cycled on and off at a particular frequency (e.g. 10 kHz) and the received signal may be filtered to only select signals at that frequency (e.g. 10 kHz). This filters out any noise due to IR in the ambient variation and in particular fluctuations in the IR in the ambient light.

The touch system described herein may be calibrated in order to cancel out any unwanted reflections inherent in the design which may arise from, for example, reflections from within the LCD panel. Such calibration may also be used to overcome any variations between different units and within a single unit die to tolerances in the manufacturing process. Calibration may also be used to cancel out artifacts due to ambient lighting conditions which may vary with time. Initial calibration (e.g. to overcome manufacturing artifacts) may be performed by detecting the level of light without any items touching the display or being in proximity to the display. This background level may then be subtracted from any subsequent measurements. Dynamic calibration may be carried out instead of or in addition to the initial calibration by regularly capturing background levels even when the touch panel is operating, using certain techniques to differentiate between changes in sensed background levels and changes due to interaction with the touch panel. For example, when no change in the received IR levels are detected these levels may be used for subtraction from detected signals instead of the initial calibration results. In a further example, detected levels may be analyzed and any fixed touch events which do not change over a defined period of time (e.g. in the order of minutes) may be discounted. Such calibration may be applied across the entire touch panel, or may be applied to sub-areas of the panel. In another example, when no change in received IR levels are detected, re-calibration may be initiated.

Figure 5:
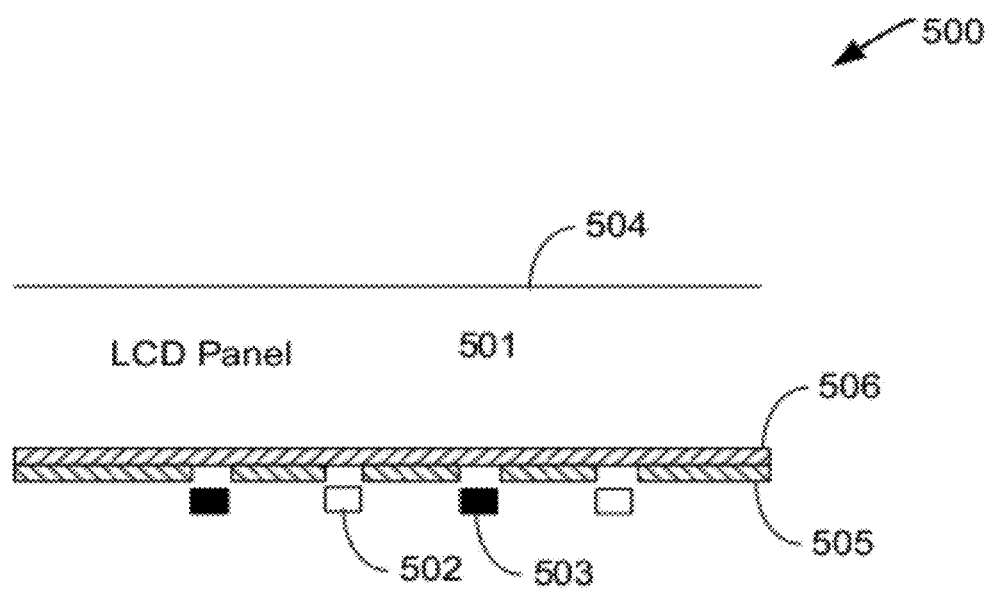
FIG. 5 shows a schematic diagram of a further touch panel which includes a mask layer behind an LCD panel.

FIG. 5 shows a schematic diagram of a further touch panel 500 which comprises an LCD panel 501 with IR sources 502 and IR detectors 503 located behind the LCD panel (i.e. on the opposite side to the touch surface 504). In order to reduce the stray IR detected by the detectors, which may result in detection of spurious touch events, a mask layer 505 may be placed behind the LCD panel which is made of a material which is opaque to IR and which has holes which are aligned with the sources and detectors. In some examples, a second layer 506 may be included between the mask layer 505 and the LCD panel 501. This second layer 506 may be made of a material which is transparent to IR and which reflects visible light. This means that viewers of the touch panel system cannot see the mask pattern irrespective of their viewing angle.

Where a large touch panel system comprises multiple touch panels (e.g. to create a large touch panel wall) the sources in the panels may be switched on sequentially (e.g. alternating panels at any one time) and the detection in the panels synchronised with the switching of the panels. This reduces the overall power consumption and reduces interference caused by stray reflections within and between the panels.

Figure 6:
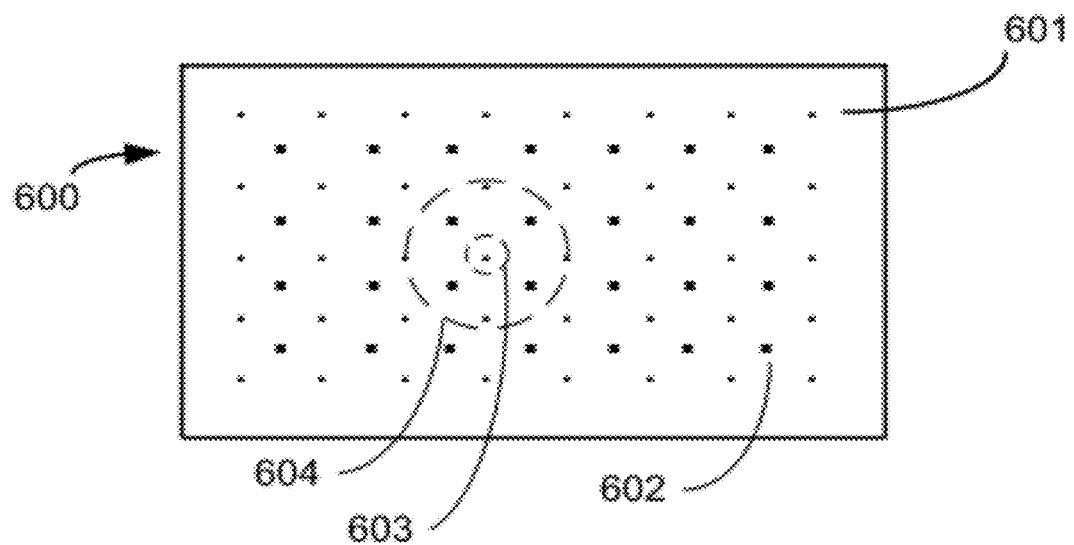
FIG. 6 shows a schematic diagram of another exemplary touch panel.
Figure 7:
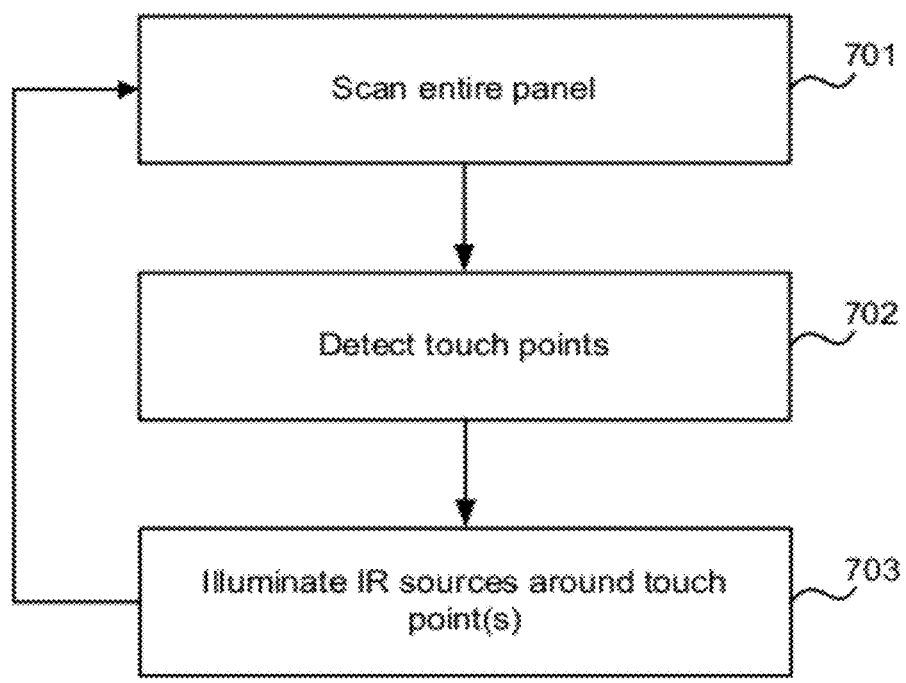
FIG. 7 shows an example flow diagram of a method of reducing the power consumption of a touch panel.

In order to reduce the power consumption of the touch panel system, an intelligent algorithm may be used to only illuminate IR sources around a touch point, as shown in FIGS. 6 and 7. FIG. 6 shows a schematic diagram of an example touch panel 600 which comprises an array of IR sensors 601 and an array of IR sources 602. In other examples, one or more IR sources may be used with a light guide (as described above). A scan of the entire panel (block 701) may be used to detect touch events (block 702), e.g. a touch event in the area indicated by dotted circle 603 and then sources around the detected events (e.g. those within dotted circle 604) may be illuminated (block 703). The entire panel scan (block 701) may be repeated periodically (e.g. at 1 Hz, 10 Hz etc) to detect touch events. The interval between entire panel scans may be fixed or may be variable dependent on battery life (e.g. larger intervals for lower battery life). In another example, shadow mode may be used for the scan of the entire panel (in block 701).

In a variation on the method of FIG. 6, the area around the detected touch event may be scanned at a higher frame rate (e.g. 50 Hz) than the entire panel. In this example, the overall power consumption may not be reduced.

Figure 8:
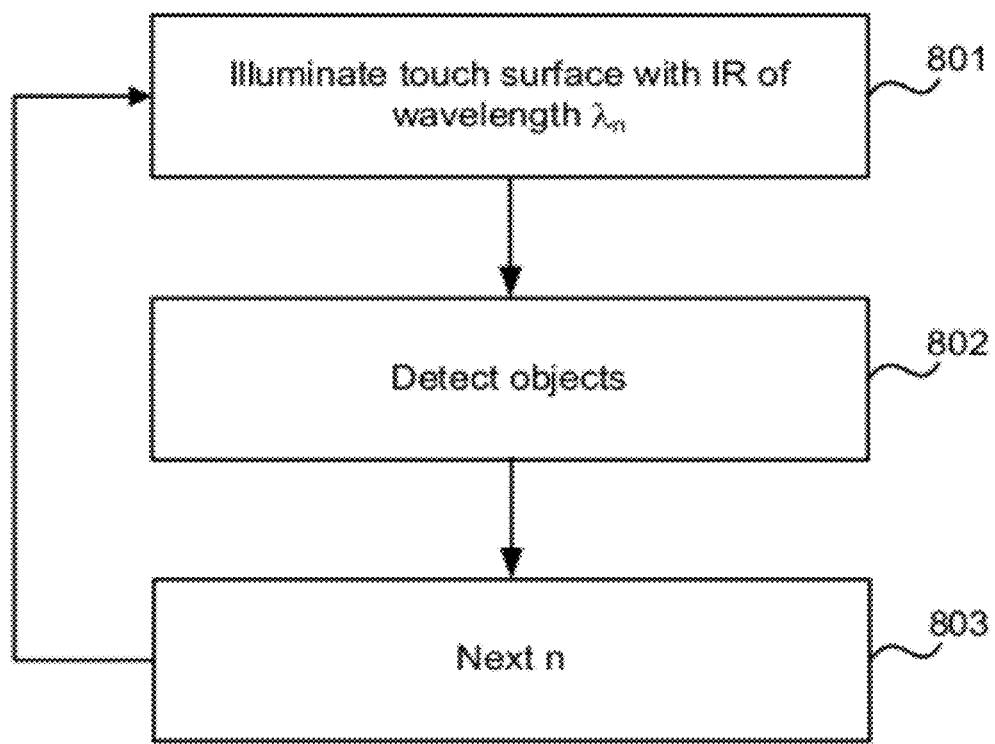
FIG. 8 shows an example flow diagram of a method of distinguishing between objects in proximity to the touch panel.

In the above description, the use of a single IR wavelength (or a narrow range of wavelengths) is described. However, in order to distinguish between multiple objects placed on the touch panel system, each object may comprise a wavelength selective tag or label, which may then be read using different wavelengths of IR (e.g. 850 nm, 980 nm or more closely spaced wavelengths), as shown in the example flow diagram of FIG. 8. The touch surface is illuminated with IR of wavelength (block 801) and the reflected signal detected and analyzed to identity any objects (block 802). The process is then repeated for the next wavelength (blocks 803, 801, 802) etc. In some examples, a combination of detection of the shape and the wavelength of the tag may be used to distinguish between objects (in block 802).

The wavelength selective tag may be in the form of a coating on part of or the entire surface of the object which is in contact with the touch panel system. The tag may, for example, comprise a holographic film, a Bragg grating, a wavelength-selective thin film or any other wavelength-selective reflector.

In order to use such wavelength selective reflectors to distinguish between objects, the touch panel may comprise IR sources of different wavelengths (e.g. a first array emitting IR wavelength and a second array emitting IR wavelength $\lambda_2$). When IR sources of a first wavelength, $\lambda_1$ are turned on (in block 801), bright reflections will be detected (in block 802) from those objects having a tag which reflects that wavelength and when IR sources of a second wavelength, $\lambda_2$, are turned on (block 803, then block 801), bright reflections will be detected (in block 802) from those objects having a tag which reflects the second wavelength. As described earlier, the touch panel may in some examples not comprise an array of sources but instead one or more IR sources of each wavelength may be used in combination with a light guide. In another example, the touch panel may comprise one or more tunable IR sources (e.g. a tunable LED or a tunable laser) and the objects may be detected and distinguished by scanning the wavelength of the tunable source.

In another example, color sensing may be used to further differentiate different barcodes. In this example, IR light may be used to detect the presence of an object, and then white illumination and color detectors used to determine an object's identity (or to assist in this identification).

The objects may, for example, be gaming pieces, physical user interface (UI) devices, such as dials, sliders etc, identity tags for users (e.g. to log in a user may place his/her tag on the touch panel, where the user is identified by the wavelength of the wavelength-selective tag, or the tag in combination with other distinguishable features) or any other object.

Whilst in the example above, the tags on objects may be selective using wavelength, in other examples other optical properties may be used to provide wavelength selective tags, such as the angle of illumination (e.g. by powering different sources, moving sources etc), intensity or polarization of the illuminant. The tag may comprise a holographic film, a thin light pipe or any suitable selective reflector.

Whilst use of reflective mode alone is suitable for many applications, there may be situations where the use of both shadow and reflective modes provides an improved touch detection system (e.g. one which is less sensitive to varying lighting conditions). For example when the level of ambient IR falling on sensors not occluded by a fingertip is similar to (or greater than) the level of reflected light falling on sensors that are underneath the fingertip, reflective mode will not be very effective. Such a touch panel may comprise the same elements as those described above (e.g. that shown in FIG. 2) or alternatively the touch panel may comprise additional sensors for use in shadow mode.

There are many ways in which shadow mode and reflective mode may both be used by a touch panel system:
- use of shadow mode for portions of the touch panel where the ambient light level exceeds a threshold
- use of shadow mode to provide a low power consumption mode
- use of both shadow mode and reflective mode to detect a particular object or to provide additional information about the object (e.g. depth, thickness etc)
- use of both shadow mode and reflective mode data to distinguish between touch and no touch events Each of these are described in more detail below with reference to FIGS. 2, 6 and 9-12.

Figure 9:
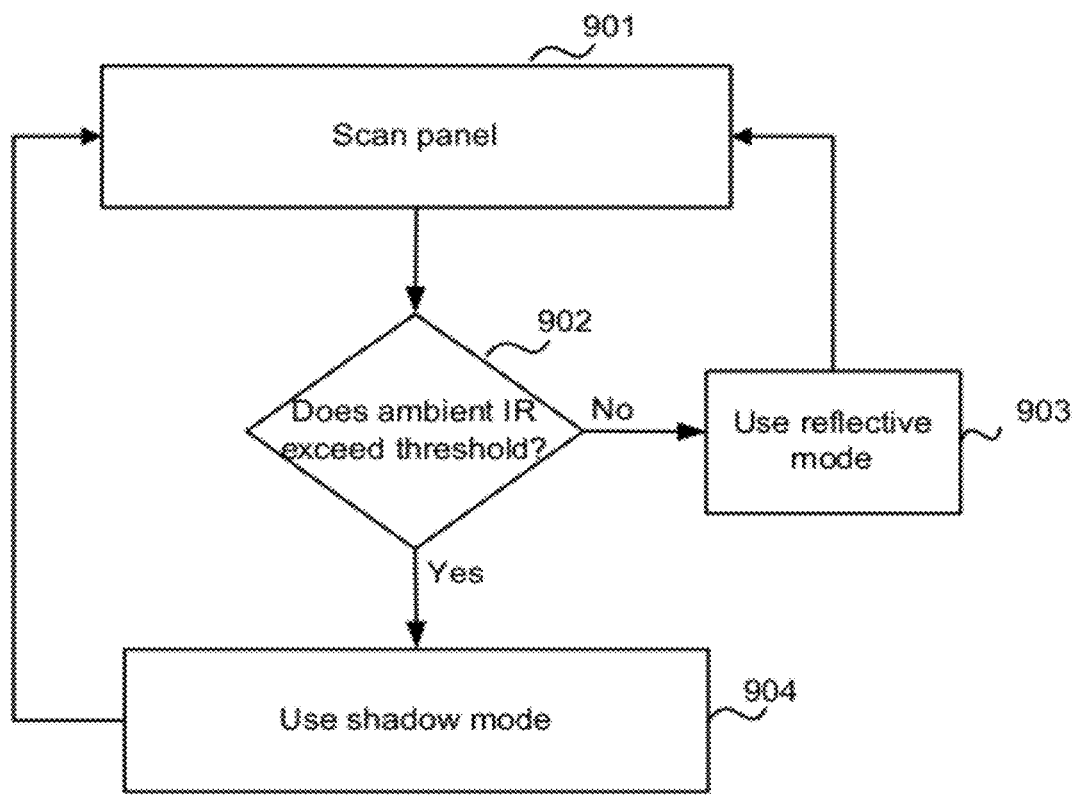
FIG. 9 shows an example flow diagram of a method of operating a touch panel system.

As described above, there may be situations where the level of ambient IR falling on the sensors is high which reduces the effectiveness of reflective mode for detection of touch events. Therefore, as shown in FIG. 9, the touch panel system, which may comprise touch panel 600, as shown in FIG. 6, may detect the level of ambient IR (block 901) and if the detected level does not exceed a defined threshold ('No' in block 902), reflective mode is used (block 903) for the detection of touch events. However, if the detected level does exceed that threshold ('Yes' in block 902), shadow mode may be used instead (block 904). This decision may be taken on the basis of the whole panel (i.e. if the level of ambient IR at any point on the panel exceeds the threshold, then shadow mode is used instead of reflective mode) or alternatively, the decision may relate to portions of the panel (e.g. shadow mode is used for those portions of the display where the ambient IR exceeds the threshold). The portions may be of fixed size (e.g. the panel may be segmented into 6 portions and if the ambient IR at any point in that panel exceeds the threshold, then shadow mode is used for that portion) or of variable size (e.g. shadow mode is only used in the particular area where the ambient IR exceeds the threshold). As described above, the threshold (used in block 902) may be set based on a known maximum possible level of reflected IR.

Figure 10:
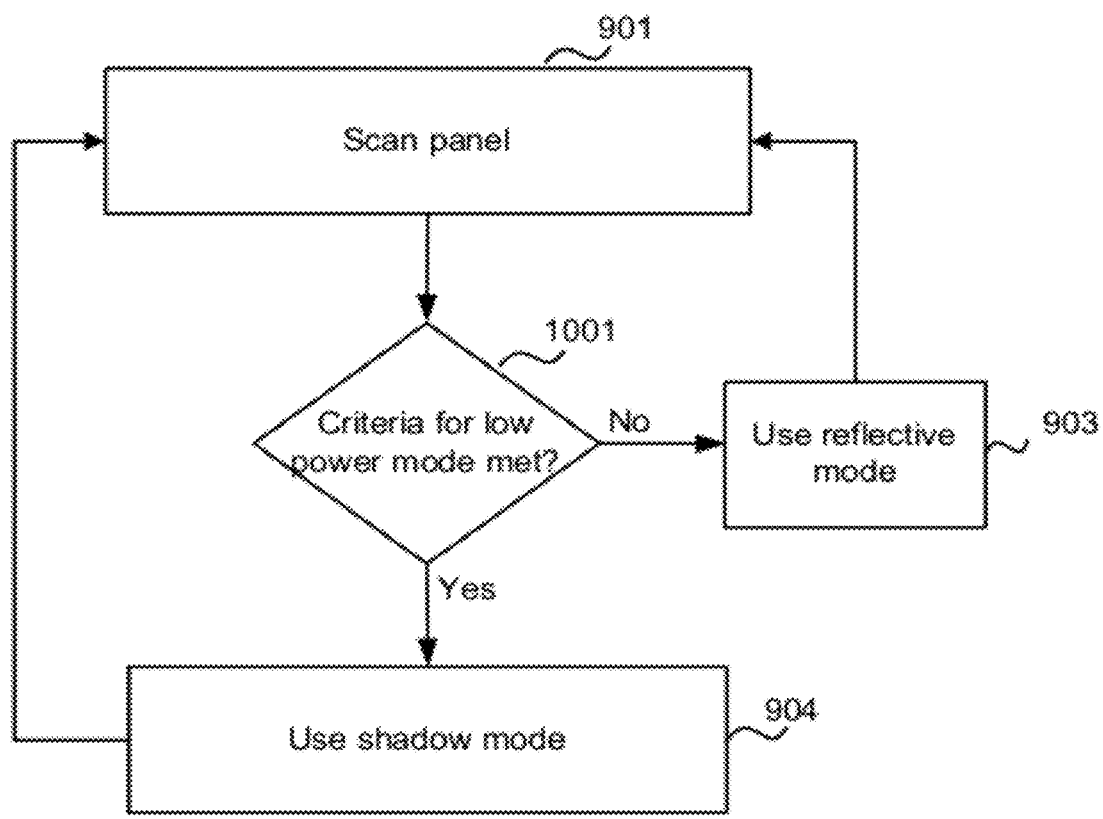
FIG. 10 shows another example flow diagram of a method of operating a touch panel system.

Reflective mode is a more power hungry mode of operation than shadow mode, because of the requirement to power the IR sources and therefore in some examples, shadow mode may be used to provide a low power mode of operation of the touch panel, as shown in FIG. 10. This low power mode of operation may be used when the battery level falls below a certain level, when user enabled, during periods of inactivity or at any other time (referred to herein as 'low power mode criteria', assessed in block 1001). In an example, the touch panel may use shadow mode (block 904) during a period of inactivity (i.e. no touch events detected in block 901, resulting in a 'Yes' in block 1001), however, when a potential touch event is detected in shadow mode (resulting in a 'No' in block 1001), the IR sources may be illuminated for all or a part of the touch panel such that reflective mode can be used for detection of the touch event (block 903). After a further period of inactivity (a subsequent 'Yes' in block 1001), the touch panel system may revert back to shadow mode (block 904). This low power mode may be enabled on the entire touch panel or on portions of the panel and the criteria may be assessed (in block 1001) on the basis of the entire panel or portions of the panel.

Figure 11:
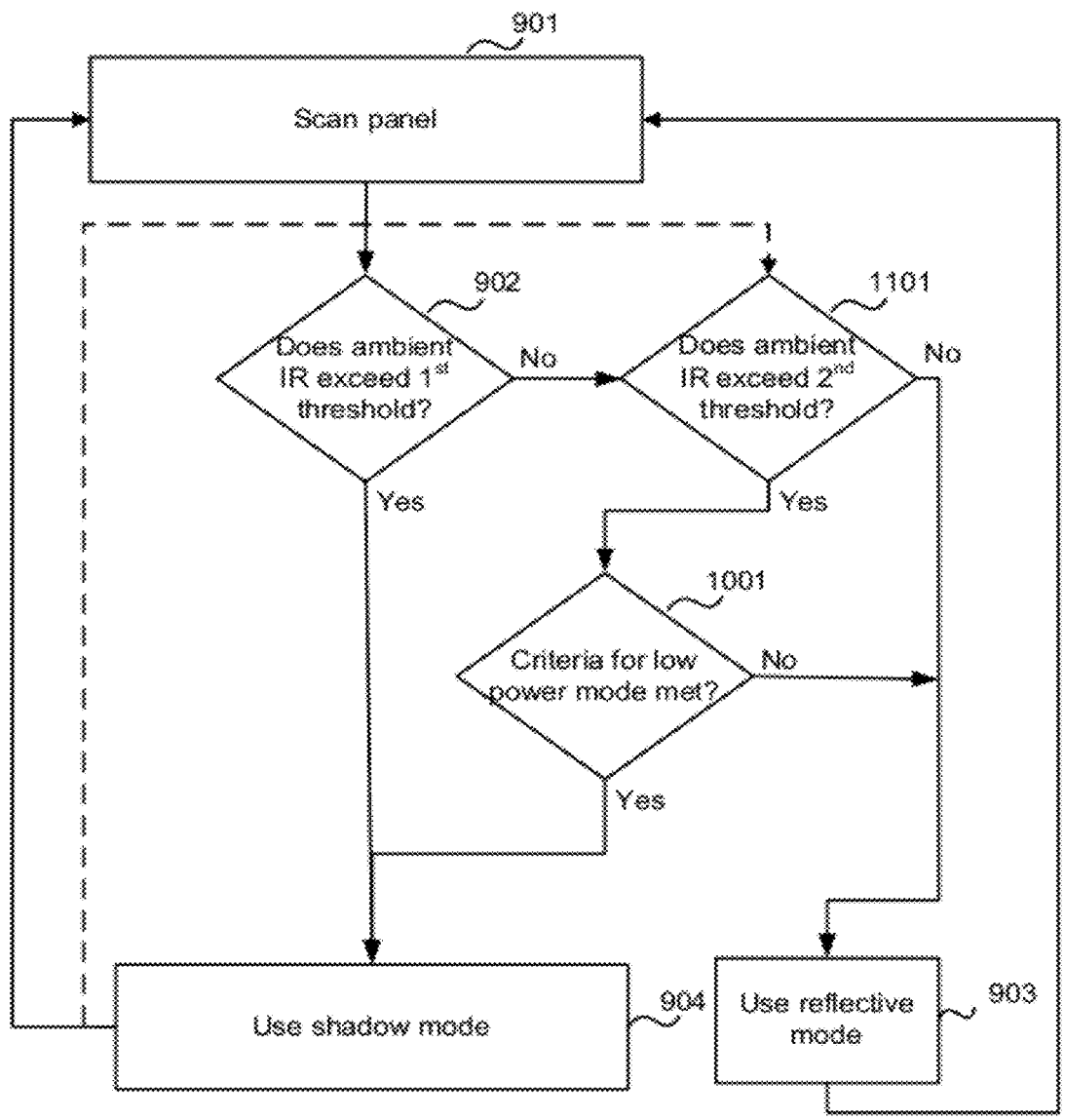
FIG. 11 shows a further example flow diagram of a method of operating a touch panel system.

In a further example, aspects of these two techniques may be combined as shown in the example flow diagram of FIG. 11 such that the low power shadow mode is only able to be enabled (e.g. based on a period of inactivity or other criteria, as described above, determined in block 1001) where the ambient light exceeds a defined threshold (as determined in block 1101). This ensures that the touch panel system does not enter the low power mode in a situation where a touch event cannot be detected using shadow mode and therefore the touch panel system would not receive a 'wake-up' signal as described above which causes it to change into reflective mode. The threshold used to determine whether a low power mode may be used (in block 1101) will be different to the threshold used to determine that reflective mode may be less suitable (in block 902), e.g. it will be set at a lower level of ambient IR. If the panel enters low power mode, the level of ambient light and the criteria for the low power mode may be monitored periodically or constantly, as indicated by the dotted arrow (from block 904 to block 1101).

Figure 17:
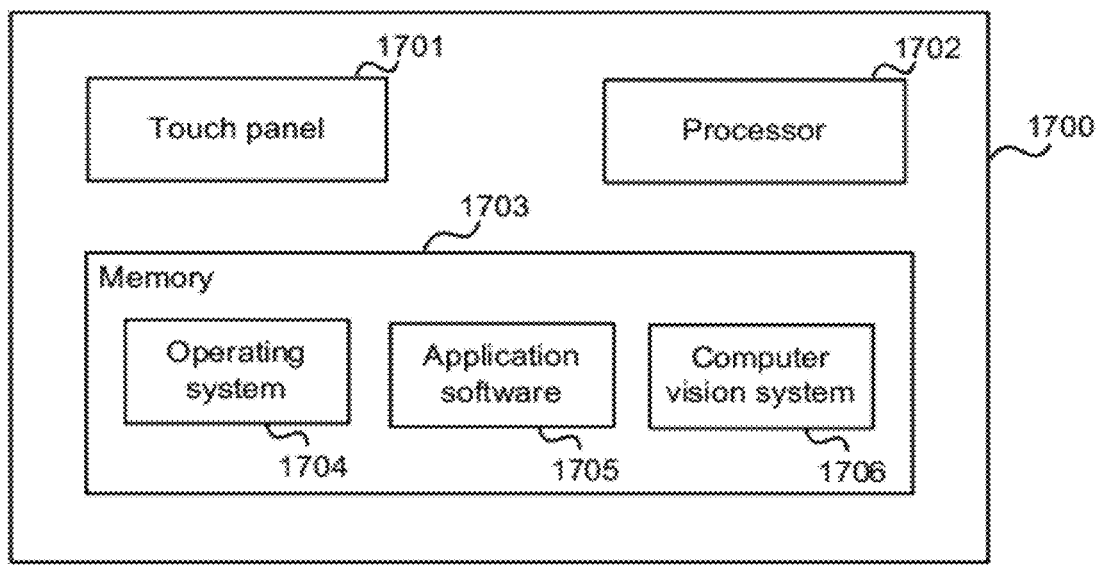
FIG. 17 illustrates an exemplary computing-based device in which embodiments of the methods described herein may be implemented.

The decisions (in blocks 902, 1001, 1101) may be made by a control element within the touch panel system. The control element may be implemented using logic in hardware, or the control element may comprise a processor and memory (e.g. as shown in FIG. 17 and described below).

As shown in FIG. 2, the position of sensors detecting the reflected light in reflective mode may be offset from the actual position of the object on or adjacent to the touch panel. When both shadow and reflective modes are used, the sensors detecting the shadow caused by an object on or close to the touch panel may be different from those detecting the reflected light. Analysis of the different detection patterns in each mode, obtained by modulating the IR sources and detecting the shadow in the periods when the IR source is off, may be used to obtain information on the distance between the object and the touch panel surface (referred to herein as 'depth detection') or to determine between a touch or no touch situation. In a simple example, an object which is not in contract with the screen will cast a larger shadow; however the amount of reflected light will be less than if it was in contact with the screen.

Use of shadow mode, instead of or in addition to reflective mode to detect depth (or to make touch/no touch decision) enables a more accurate detection because the curve on distance detection for reflective mode (i.e. power detected vs. distance) is not monotonic, whilst the corresponding curve for shadow mode is monotonic. Detection of touch/no touch may be implemented using an adaptive threshold, which may be adapted based on the detected ambient light level or based on the detection of an approaching object using shadow mode. In other examples, the detection may use two thresholds (one for reflective mode and one for shadow mode).

Figure 12:
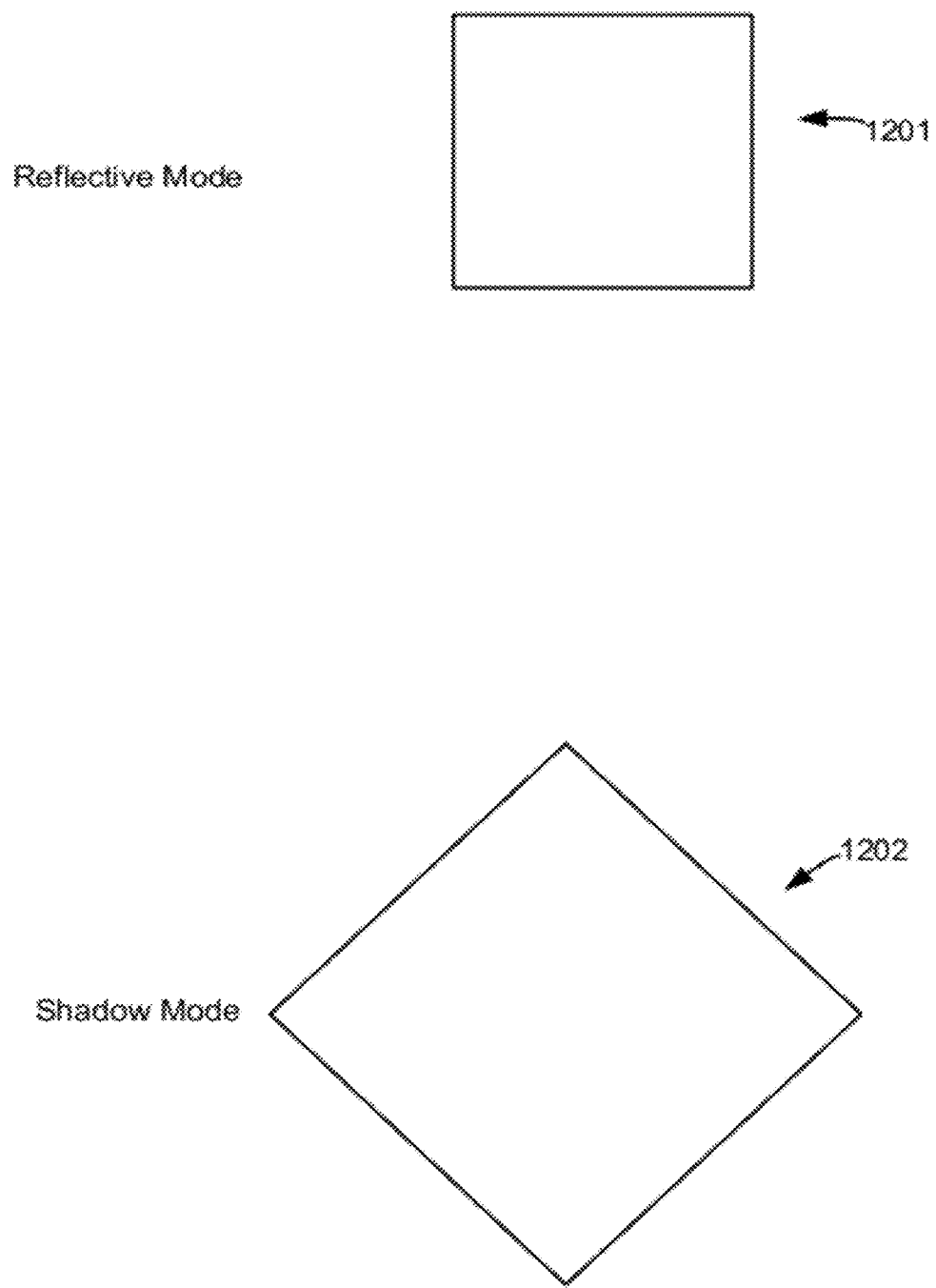
FIG. 12 shows two example detected shapes, in reflective and shadow modes of operation.

Dependent on the ambient light, multiple shadows may be cast by an object. In some circumstances this may provide additional 3D information about an object, e.g. as shown in FIG. 12, with a first shape 1201 detected in reflective mode and a second shape 1202 detected on shadow mode. By processing the two images (i.e. the sensor data from the array of sensors), it is possible to determine that the object is, in this example, shaped like a pyramid. Whilst in other examples, it may not be possible to determine the exact shape of the object, analysis of the two detected images (one from reflective mode and one from shadow mode operation) may provide information on the approximate shape or thickness of the object (e.g. is it a planar object like a piece of paper or does it have substantial thickness like the gaming pieces shown in FIG. 1).

In addition to, or instead of, using a combination of shadow and reflective modes, the IR sources within the touch panel may be switched on and off (or modulated at higher speed) in groups such that the angle of illumination of an object changes dependent upon the group of sources which are switched on (e.g. odd columns/rows followed by even columns/rows). In some examples, the illumination pattern may be varied based on the detected shape (e.g. to illuminate additional or different sources around the periphery of the detected shape). Analysis of the detected signals for each group of sources may provide some 3D information about the object (e.g. is it thin like a sheet of paper or does it have appreciable thickness), may improve the accuracy of the detected shape and may also enable the cancellation of any specular reflections e.g. due to the user wearing a ring. This may also reduce the overall power consumption of the touch panel system, which may be particularly useful where the system is battery operated and reduce interference caused by stray reflections within the touch panel.

In another example, instead of providing different sets of IR sources, the position of the light source in the touch panel may be movable. By moving the source, the angle of illumination is again changed, therefore enabling detection of 3D information. The same effect may be achieved by moving a light guide which guides light from an IR source.

In another embodiment, the touch panel may control the ambient lighting. This control may, for example, use a Bluetooth, X10, IrDA (as described below) or other wireless link. In such an embodiment the touch panel may control ambient light sources (which emit IR and may also emit visible light) so as to provide an optimised environment for use of shadow (or reflective) mode and/or to change the lighting angle to obtain depth/3D information, as described above. A computer vision system may be used to analyze the combined signals from the detectors within the system and control the ambient lighting based on the levels detected.

Instead of, or in addition to, controlling the ambient lighting, the combined detected signals may be analyzed and the IR sources controlled based on the detected signals. This allows the touch panel to compensate for variations in IR ambient light across the touch panel which might otherwise degrade the sensing ability.

In a further example, the touch panel may further comprise an array of detectors which are sensitive to visible light. In a similar manner to that described above, the combined detected signals from these visible light detectors may be analysed and used to control the brightness of parts of the image displayed on the touch panel. This may be achieved, for example, by changing the brightness of the back light or some of the LEDS in a LCD display. This enables the touch panel to compensate for variations in ambient visible light (e.g. due to sunlight or shadows on a portion of the display). The visible detectors (and sources) may also be used to assist in the identification of objects in proximity to the touch surfaces, as described above.

In addition to detection of touch events, the IR sources and/or sensors may be arranged to enable data communications between the screen and a nearby object. The communications may be uni-directional (in either direction) or bi-directional. The nearby object may be close to or in contact with the touch surface, or in other examples, the nearby object may be at a short distance from the touch screen (e.g. of the order of meters or tens of meters rather than kilometers).

Figure 13:
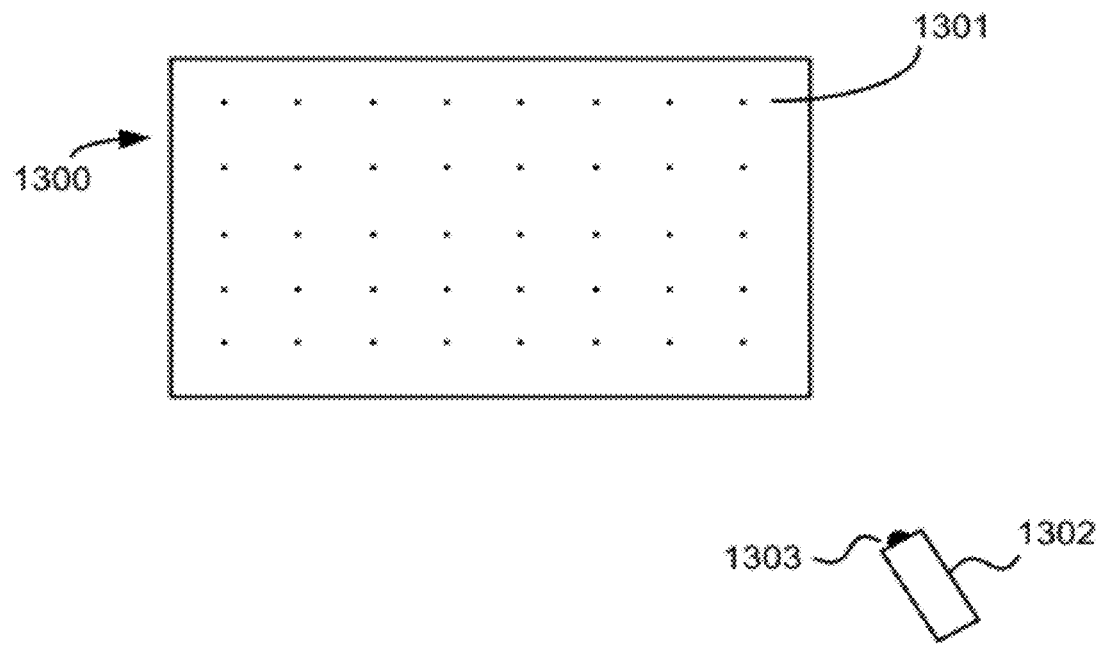
FIG. 13 is a schematic diagram of a first example of a touch panel system capable of communication with a nearby device.
Figure 14:
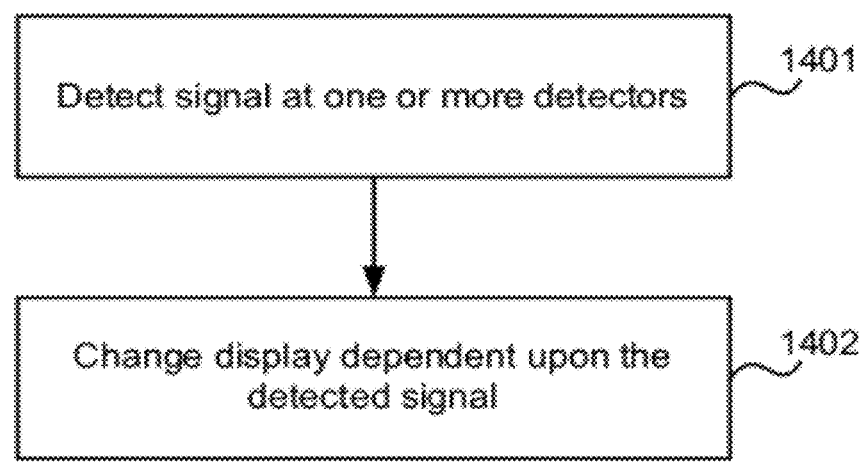
FIG. 14 is an exemplary flow diagram of a method of operation of the system of FIG. 13.

In a first example, as shown on FIG. 13, the touch panel 1300, which may comprise an array of infra-red detectors 1301 (e.g. IR sensitive TFTs or IR-sensitive photodiodes), may receive an IR signal from a nearby device 1302 including an IR transmitter 1303. The operation, as shown in FIG. 14 involves the detection of the signal at one or more of the detectors (block 1401) and changing the display dependent upon the detected signal (block 1402). The display may be changed (in block 1402) in many different ways, for example:

Display of a pointer icon on the touch panel dependent on the position of the detector receiving the signal. This provides a pointer system for use with a touch panel. This system may be used in many applications including presenting, gaming etc.

Changing the user interface (UI) according to the detected pointing parameters (e.g. location, modulation scheme etc, as described in more detail below). This enables the movement of the device 1302 (e.g. when the user gestures or points) to be used to control the images/data displayed, navigation through various windows of a UI etc.

Controlling the application running on the display system according to the pointing parameters.

The signal transmitted by the nearby device 1302 may use any suitable protocol, such as the standard TV remote control protocol or IrDA. The shape of the beam projected by the nearby device may be controlled (e.g. a circle, square or cross-shaped) and may be fixed or variable. The change to the display (e.g. the pointed icon displayed) may be dependent upon the shape detected and/or any other parameter detected in relation to the IR signal (e.g. the modulation scheme used, as described in more detail below). The shape detected may also be used to determine the location of the person holding the device with respect to the touch panel and where a cross-hair is used, the rotation of the device may be determined. This may enable the image displayed to change based on the user's location or an aspect of the game to be controlled based on the detected pointing parameters (e.g. shape, modulation scheme etc).

Aspects of the detected signal may, in some examples, be used to calibrate the response to signals received. For example, the intensity of the detected signal may be used to determine the approximate distance between the device 1302 and the touch panel 1300 and the response to detected signals (in block 1402) may be changed based on this determination. In an example, where the touch panel system detects gestures, the size of the expected gesture may be normalised based on the determined distance between the device and the touch panel.

In order that the display can distinguish multiple pointing events substantially simultaneously, different devices may use different beam shapes, different wavelengths or different modulation (e.g. amplitude modulation) schemes. In an example, the signal may be modulated according to an identifier associated with the device (e.g. a Bluetooth MAC address) such that the information may be used to identify the device and for subsequent communication (e.g. by Bluetooth in this example).

In a further example, different pointing events may be distinguished using spatial multiplexing. In this example, the detected signal from multiple detectors may be analyzed (e.g. using a computer vision system) to determine whether two beams are being received (e.g. because there are two spatially separated groups of detectors which are detecting the signal or the shape detected is a partially overlapping combination of two known beam shapes). In another example, different nearby devices 1302 may be allocated different time slots for transmission of a pulsed IR signal (i.e. time division multiplexing) or different wavelengths may be used.

Such a device 1302 may provide a user interface device for the touch panel. The touch panel may be arranged to interpret the detected shapes as user inputs (e.g. rotation of cross-hairs, gestures etc) and thereby control an application running on the display (e.g. use of gestures to move items between different displays). This may be combined with data communications between the touch panel and the device (e.g. if a user presses a button on the device) and this is described in detail below. Such a device, may for example, provide a games controller and the detection of multiple pointing events, as described above, may provide means for multiple players to interact with the game via the touch panel substantially simultaneously. In an example, the nearby devices may comprise games controllers and the detection of multiple pointing events may enable a multiplayer shooting game to be played on the touch panel system.

In addition to having an IR transmitter 1303, the device 1302 may also comprise a visible transmitter (not shown in FIG. 13) such as a visible laser or LED. In such an example, the visible transmitter may be used for pointing and the IR transmitter may be used for data communications to control the application which is running. The application may be a presentation application (such as Microsoft PowerPoint (trade mark), a game or any other application.

Figure 15:
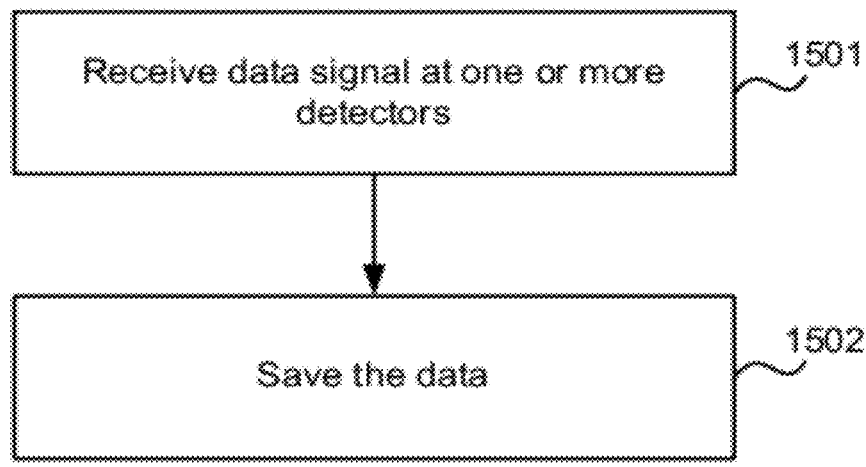
FIG. 15 is a second exemplary flow diagram of a method of operation of the system of FIG. 13.

In a second example of communications with a touch panel using IR, the signal received (e.g. from nearby device 1302) may comprise data (encoded in a modulated signal), rather than being a pointer signal. As shown in FIG. 15, the modulated IR signal which comprises data may be received at one or more of the sensors 1301 in the touch panel (block 1501) and then stored (block 1502). In order that data may be received from more than one device substantially simultaneously, spatial, frequency or time division multiplexing may be used in a similar manner to detection of multiple pointing events, as described above. As described above, any suitable protocol may be used, such as IrDA.

Figure 16:
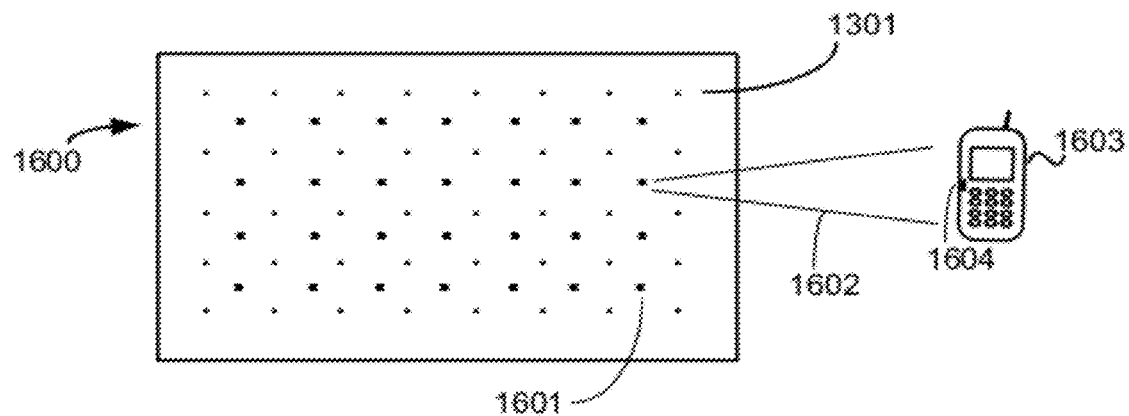
FIG. 16 is a schematic diagram of a second example of a touch panel system capable of communication with a nearby device.

In addition to, or instead of, receiving data from a nearby device, the touch panel may transmit data to one or more nearby devices, as shown in the schematic diagram of FIG. 16. The touch panel 1600 comprises, in addition to an array of IR sensitive detectors 1301, one or more IR sources 1601 which may be used to illuminate nearby objects for use in reflective mode (as described above). One or more of the IR sources 1601 may be used to transmit data (indicated by beam 1602) to a nearby electronic device 1603 equipped with an IR receiver 1604 or a dedicated IR source may be provided for data transmission. The data may be broadcast such that all electronic devices which are within range can receive the data, or alternatively the data may be transmitted using different modulation schemes, or multiplexing techniques (e.g. spatial, frequency or time) in order to transmit different data to different devices.

In some examples, a DC-balanced encoding scheme is used for data transmission between the touch panel and one or more nearby devices. This data transmission is modulated at a rate faster than that required by the touch panel to detect a specified type of touch event, such as a fingertip touch. In this way, the touch panel is able to carry out data transmitting substantially simultaneously with touch event detection.

In some examples, the touch panel system is arranged to detect the outline of a nearby electronic device (such as 1302 of FIG. 13) either in reflective mode or shadow mode. This enables the touch panel system to detect the presence of the nearby electronic device and to "expect" possible data communication with that nearby device. For example, the touch panel system may be arranged to switch at least some of the sensors within the detected outline into data communications mode.

Whist the nearby devices in FIGS. 13 and 16 are depicted as a pointing device 1302 and a mobile telephone 1603 this is by way of example only and the touch panel may communicate with any nearby device comprising an IR transmitter and/or receiver. The devices may be located close to or in contact with the touch panel (e.g. intelligent game pieces) or at a distance from the touch panel (e.g. laptop or desktop computer, PDA, games console, games controller, light controller etc).

The data transferred between a nearby device and the touch panel may be of any kind, including data for display on the touch panel, such as images captured on a digital camera (which may, for example, be integrated within a mobile telephone or PDA). In another example, the data transferred may be an identifier (e.g. the ID of a pointing device or the identifier for a particular data set which should be displayed on the touch panel). In an example, an identifier for a particular data set may be transmitted from the touch panel to a nearby device and then a gesture may be used to transfer that data set to another touch panel display system.

In order to reduce the power consumption of the touch panel, the touch panel may only scan a subset of the sensors 1301 and upon detection of a signal (e.g. in block 1401 of FIG. 14), the panel may scan all the sensors 1301 in order to determine the full parameters of the signal (e.g. to determine the aspects of any gesture in detail).

FIG. 17 illustrates various components of an exemplary computing-based device 1700 which may be implemented as any form of a computing and/or electronic device, and in which embodiments of the methods and apparatus described above may be implemented.

Computing-based device 1700 comprises a touch panel 1701, for example as described above and shown in any of FIGS. 2, 3, 5, 6, 13 and 16, and one or more processors 1702. The one or more processors may be microprocessors, controllers or any other suitable type of processors for processing computing executable instructions to control the operation of the device in order to detect multiple touch/pointing events and/or to transmit or receive data to/from a nearby device. The computer executable instructions may be provided using any computer-readable media, such as memory 1703. The memory is of any suitable type such as random access memory (RAM), a disk storage device of any type such as a magnetic or optical storage device, a hard disk drive, or a CD, DVD or other disc drive. Flash memory, EPROM or EEPROM may also be used.

Platform software comprising an operating system 1704 or any other suitable platform software may be provided, and stored in memory 1703, to enable application software 1705 to be executed on the device. The application software may include a computer vision system application 1706.

The computing-based device may also comprise one or more inputs which are of any suitable type for receiving media content, Internet Protocol (IP) input, user instructions from a user input device etc, a communication interface and one or more outputs such as an audio output.

Although the present examples are described and illustrated herein as being implemented in an IR based system, the system described is provided as an example and not a limitation. As those skilled in the art will appreciate, the present examples are suitable for application in a variety of different systems which may use different wavelengths of electromagnetic radiation (e.g. visible light). In addition, instead of using the arrangement of IR sources described above, the touch panel may use FTIR (frustrated total internal reflection) where the IR source emits a beam parallel to the touch surface and the IR sensors detect a drop in intensity.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a storage medium. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. It will further be understood that reference to 'an' item refer to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A method of operating a touch panel system for detecting one or more objects in proximity with a touchable surface of a touch panel, the method comprising:
    scanning at least a portion of the touch panel to measure a level of ambient infrared radiation using at least one infrared sensor;
    switching to a shadow mode of operation if the level of ambient infrared radiation exceeds a first threshold;
    detecting a first shape of an object adjacent the touch panel while in the shadow mode of operation;
    switching to a reflective mode of operation if the level of ambient infrared radiation does not exceed both the first threshold and a second threshold, wherein the switching between the shadow mode and the reflective mode changes an angle of illumination of the object adjacent to the touch panel;
    detecting a second shape of the object while in the reflective mode of operation;
    analyzing the detected first and second shapes; and
    determining a three-dimensional shape and thickness of the object based at least in part on the changes in the angle of illumination analysis of the first and second shapes.

2. The method of claim 1, further comprising:
    determining that a battery level is below a predetermined limit while the level of ambient infrared radiation exceeds the second threshold and not the first threshold; and
    switching to the shadow mode of operation after the battery level drops below the predetermined limit.

3. The method of claim 2, further comprising switching to the reflective mode of operation after the battery level rises above the predetermined limit.

4. The method according to claim 2, wherein the first threshold is higher than the second threshold.

5. The method according to claim 2, wherein the touch panel system further comprises a plurality of infrared sources configured to illuminate the one or more objects with infrared radiation through the touchable surface, the method further comprising, in the reflective mode of operation:
    scanning the touch panel; and
    on detection of a touch event at an infrared sensor, illuminating infrared sources of the plurality of infrared sources that are in proximity to the infrared sensor.

6. The method according to claim 2, further comprising, in the reflective mode of operation:
    illuminating the touchable surface with infrared radiation of a first wavelength;
    detecting infrared radiation reflected from the object at the first wavelength; and
    repeating the illuminating and detecting steps at a second wavelength.

7. The method according to claim 1, further comprising, periodically recalibrating the touch panel system based on the scanning at least the portion of the touch panel.

8. The method according to claim 1, wherein the touch panel system further comprises a plurality of groups of infrared sources configured to illuminate the one or more objects with infrared radiation through the touchable surface, the method further comprising, in the reflective mode of operation:
    switching at least two of the groups of infrared sources on and off sequentially, wherein the switching between the at least two of the groups of infrared sources changes the angle of illumination of the object;
    detecting a third shape of the object when one of the groups of infrared sources is switched on;
    detecting a fourth shape of the object when another of the groups of infrared sources is switched on;
    analyzing the detected third and fourth shapes; and
    determining a three-dimensional shape of the object based at least in part on the analysis of the third and fourth shapes.

9. The method according to claim 1, wherein the touch panel system further comprises at least one infrared source that is configured to move in position, wherein movement of the at least one infrared source changes the angle of illumination of the object, the method further comprising, in the reflective mode of operation:

detecting a third shape of the object with the at least one infrared source in a first position;

moving the at least one infrared source from the first position to a second position;

detecting a fourth shape of the object with the at least one infrared source in the second position;

analyzing the detected third and fourth shapes; and determining a three-dimensional shape of the object based at least in part on the analysis of the third and fourth shapes.

10. A touch panel system to detect one or more objects in proximity with a touchable surface of the touch panel system, the touch panel system comprising:

a control element to:

scan at least a portion of the touch panel to measure a level of ambient infrared radiation;

switch to a shadow mode of operation if the level of ambient infrared radiation exceeds a first threshold;

detect a first shape of an object adjacent the touch panel while in the shadow mode of operation;

switch to a reflective mode of operation if the level of ambient infrared radiation does not exceed both the first threshold and a second threshold, wherein the switching between the shadow mode and the reflective mode changes an angle of illumination of the object;

detect a second shape of the object while in the reflective mode of operation;

analyze the detected first and second shapes; and determine a three-dimensional shape of the object based at least in part on the analysis of the first and second shapes;

taken together with the other elements of the claim.

11. The touch panel system according to claim 10, wherein the control element comprises:

a processor; and a memory to store executable instructions configured to cause the processor to monitor signals from the infrared sensors and switch between the reflective mode of operation and the shadow mode of operation for at least a portion of the touch panel based on the monitored signals.

12. The touch panel system according to claim 11, further comprising an array of infrared sources, wherein the memory is further configured to stored executable instructions configured to cause the processor, in the reflective mode of operation, to:

scan the touch panel; and on detection of a touch event at an infrared sensor, illuminate infrared sources of the array of infrared sources that are in proximity to the infrared sensor.

13. The touch panel system according to claim 11, further comprising:

a red light emitting diode (LED) placed behind the infrared sensors;

a green LED placed behind the infrared sensors;

a blue LED placed behind the infrared sensors; and an infrared LED placed behind the infrared sensors.

14. The touch panel system according to claim 13, further comprising:

a red color filter placed above the infrared sensors; and a blue color filter placed above the infrared sensors.

15. The touch panel system according to claim 14, further comprising a plurality of pixel electrodes placed adjacent the infrared sensors.

16. The touch panel system according to claim 15, further comprising an Infrared-transmitting polymer black matrix polymer filter located above the infrared sensors.

17. The touch panel system according to claim 10, wherein the control element is further configured to:

determine that a battery level is below a predetermined limit while the level of ambient infrared radiation exceeds the second threshold and not the first threshold;

switch to the shadow mode of operation after the battery level drops below the predetermined limit; and switch to the reflective mode of operation after the battery level rises above the predetermined limit.

18. A method of operating a touch panel system for detecting an object in proximity with a touchable surface of the touch panel system, the method comprising:

detecting a level of ambient infrared light over a portion of the touchable surface;

selecting between a first mode of operation and a second mode of operation for a region of a touch panel according to the level of ambient infrared light, wherein the first mode comprises detecting the object by detecting infrared radiation reflected from the object and wherein the second mode comprises detecting the object by detecting ambient infrared radiation;

switching to the second mode of operation after the level of ambient infrared radiation surpasses a threshold;

detecting a first shape of the object while in the second mode of operation;

switching to the first mode of operation after the level of ambient infrared radiation drops below the threshold, wherein the switching between the first mode and the second mode changes an angle of illumination of the object adjacent the touch panel;

detecting a second shape of the object while in the first mode of operation;

analyzing the detected first and second shapes; and determining a three-dimensional shape of the object based at least in part on the analysis of the first and second shapes.

19. The method according to claim 18, wherein the touch panel system further comprises a plurality of groups of infrared sources configured to illuminate the object with infrared radiation through the touchable surface, the method further comprising, in the first mode of operation:

switching at least two of the groups of infrared sources on and off sequentially, wherein the switching between the at least two of the groups of infrared sources changes the angle of illumination of the object;

detecting a third shape of the object when one of the groups of infrared sources is switched on;

detecting a fourth shape of the object when another of the groups of infrared sources is switched on;

analyzing the detected third and fourth shapes; and determining a three-dimensional shape of the object based at least in part on the analysis of the third and fourth shapes.

20. The method according to claim 18, wherein the touch panel system further comprises at least one infrared source that is configured to move in position, wherein movement of the at least one infrared source changes the angle of illumination of the object, the method further comprising, in the first mode of operation:

detecting a third shape of the object with the at least one infrared source in a first position;

moving the at least one infrared source from the first position to a second position;
detecting a fourth shape of the object with the at least one infrared source in the second position;
analyzing the detected third and fourth shapes; and
determining a three-dimensional shape of the object based at least in part on the analysis of the third and fourth shapes.

* * * * *